US009884666B2

(12) United States Patent
Starik

(10) Patent No.: US 9,884,666 B2
(45) Date of Patent: Feb. 6, 2018

(54) HUB GEAR

(71) Applicant: JustRide, Tel-Aviv (IL)

(72) Inventor: Eran Starik, Moshav Bazra (IL)

(73) Assignee: JustRide, Tel-Aviv (IL)

(*) Notice: Subject to any disclaimer, the term of this patent is extended or adjusted under 35 U.S.C. 154(b) by 0 days.

(21) Appl. No.: 15/479,412

(22) Filed: Apr. 5, 2017

(65) Prior Publication Data
US 2017/0283007 A1 Oct. 5, 2017

Related U.S. Application Data

(60) Provisional application No. 62/318,347, filed on Apr. 5, 2016.

(51) Int. Cl.
| | |
|---|---|
| *B62M 11/16* | (2006.01) |
| *F16H 3/66* | (2006.01) |
| *B62M 11/18* | (2006.01) |
| *F16H 61/02* | (2006.01) |
| *F16D 41/069* | (2006.01) |
| *F16D 41/28* | (2006.01) |

(52) U.S. Cl.
CPC ............ *B62M 11/16* (2013.01); *B62M 11/18* (2013.01); *F16H 3/66* (2013.01); *F16H 61/0295* (2013.01); *F16D 41/069* (2013.01); *F16D 41/28* (2013.01)

(58) Field of Classification Search
CPC ....... F16H 61/0295; F16H 3/64; B62M 11/16; B62M 11/18; F16D 43/06
See application file for complete search history.

(56) References Cited

U.S. PATENT DOCUMENTS

| | | | | |
|---|---|---|---|---|
| 2,720,299 A | * | 10/1955 | Niemela | ............... F02N 15/026 192/104 R |
| 3,438,283 A | * | 4/1969 | Schwerdhofer | ........ B62M 11/16 475/259 |
| 3,494,227 A | * | 2/1970 | Shimano | ................ B62M 11/16 475/259 |
| 3,513,726 A | * | 5/1970 | Shimano | ................ B62M 11/14 475/259 |

(Continued)

FOREIGN PATENT DOCUMENTS

| | | |
|---|---|---|
| DE | 19720794 | 7/1999 |
| DE | 102009042947 | 10/2010 |

(Continued)

OTHER PUBLICATIONS

International Search Report and the Written Opinion dated Jun. 27, 2017 From the International Searching Authority Re. Application No. PCT/IL2017/050413. (15 Pages).

*Primary Examiner* — Justin Holmes
*Assistant Examiner* — David Morris

(57) ABSTRACT

A multi-speed hub gear, comprising: an axle adapted to be fixed against rotation; a hub shell; a plurality of planetary gear sets, each comprising: a central gear concentrically fixed on the axle, a rotating gear carrier mounting at least one rotating gear to revolve around the center of the central gear; and a ring gear rotated by the at least one rotating gear; wherein a respective the ring gear of one of the sets is mechanically connected to a respective the rotating gear carrier of another of the sets such that the sets rotate in conjunction; and a gear shifter adapted to engage at least one of the sets to the hub shell while disengaging another of the sets from the hub shell.

26 Claims, 19 Drawing Sheets

(56) References Cited

U.S. PATENT DOCUMENTS

| | | | | |
|---|---|---|---|---|
| 3,520,214 | A * | 7/1970 | Schwerdhofer | B62M 11/14 475/259 |
| 3,557,922 | A * | 1/1971 | Schwerdhoffer | B62M 11/00 192/103 B |
| 3,603,178 | A * | 9/1971 | Lutz | B62M 11/14 192/103 B |
| 3,648,547 | A | 3/1972 | Schwerdhofer | |
| 4,065,984 | A * | 1/1978 | Nakajima | B62M 11/16 475/285 |
| 4,123,942 | A * | 11/1978 | Rumyantsev | F16D 43/06 73/535 |
| 4,229,997 | A * | 10/1980 | Schwerdhofer | B62M 11/16 192/103 B |
| 4,842,291 | A | 6/1989 | Hartmann | |
| 4,858,494 | A * | 8/1989 | Healy | B62M 11/18 192/64 |
| 6,006,881 | A * | 12/1999 | Lederman | F16D 41/067 192/113.32 |
| 6,010,425 | A * | 1/2000 | Tabe | B62M 11/16 192/64 |
| 6,158,294 | A * | 12/2000 | Jung | B62M 9/123 474/70 |
| 6,558,288 | B2 * | 5/2003 | Okochi | B62M 11/16 192/64 |
| 8,100,208 | B2 * | 1/2012 | Jordan | B62M 6/65 180/220 |
| 8,992,375 | B2 * | 3/2015 | Gobel | B62M 11/16 475/292 |
| 2002/0183159 | A1 * | 12/2002 | Okochi | B62M 11/16 475/269 |
| 2007/0275811 | A1 * | 11/2007 | Starik | B62M 11/18 475/259 |
| 2010/0261570 | A1 | 10/2010 | Hino | |
| 2011/0034283 | A1 | 2/2011 | Tsai et al. | |

FOREIGN PATENT DOCUMENTS

| | | |
|---|---|---|
| EP | 0889070 | 1/1999 |
| GB | 738338 | 10/1955 |
| WO | WO 2015/190683 | 12/2015 |

* cited by examiner

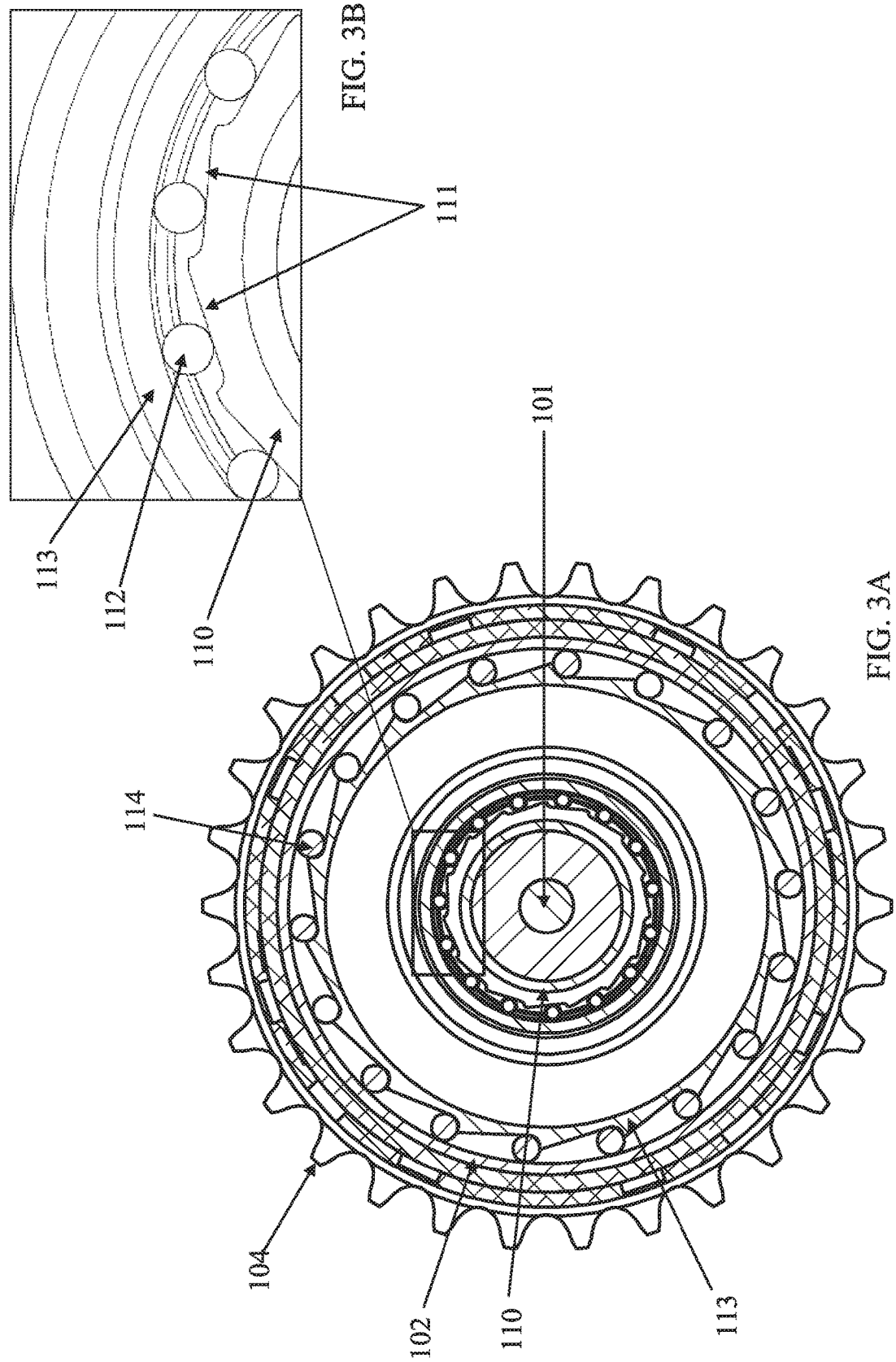

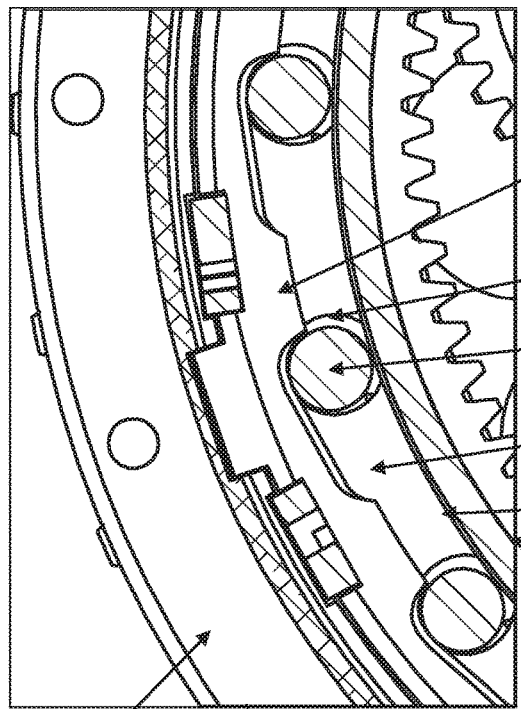
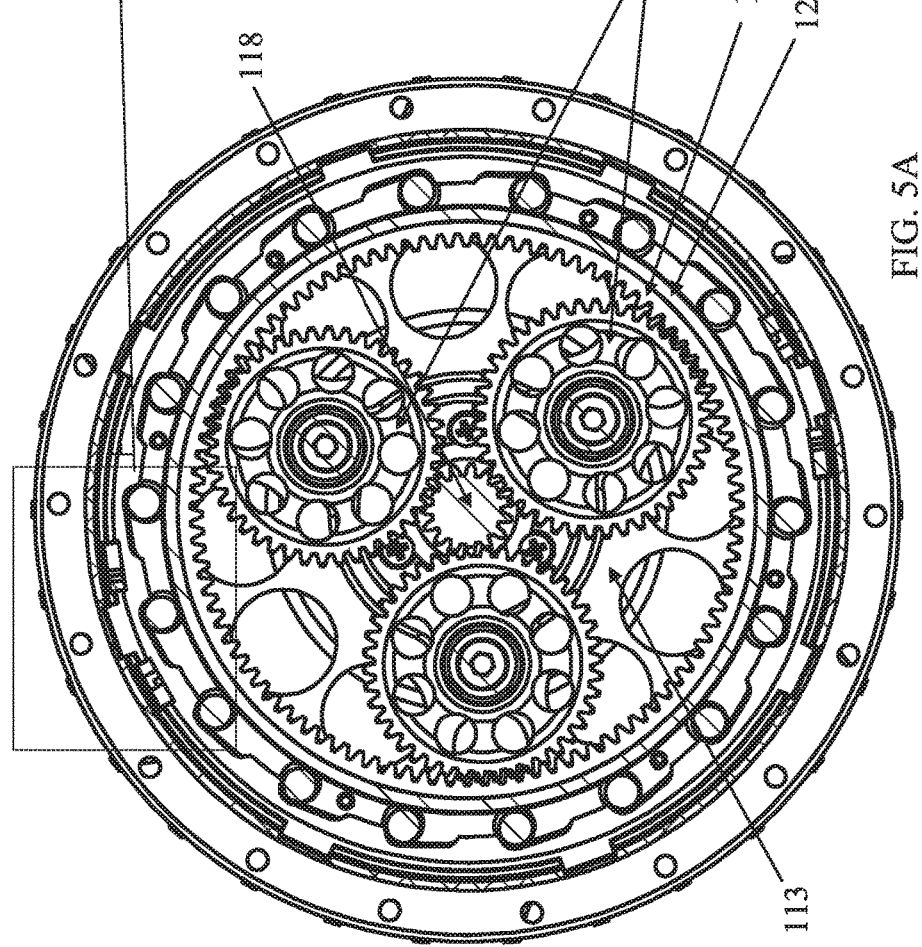

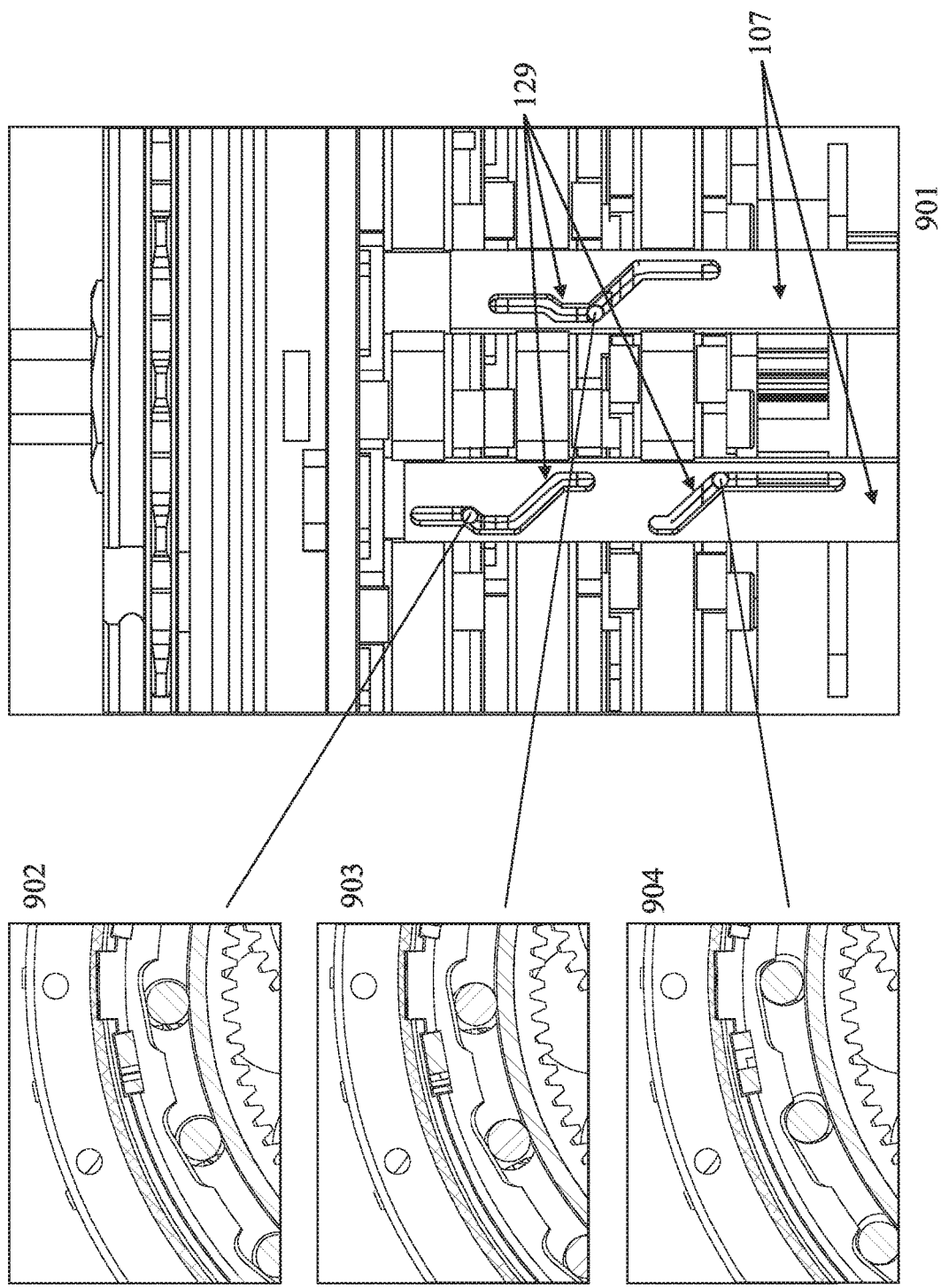

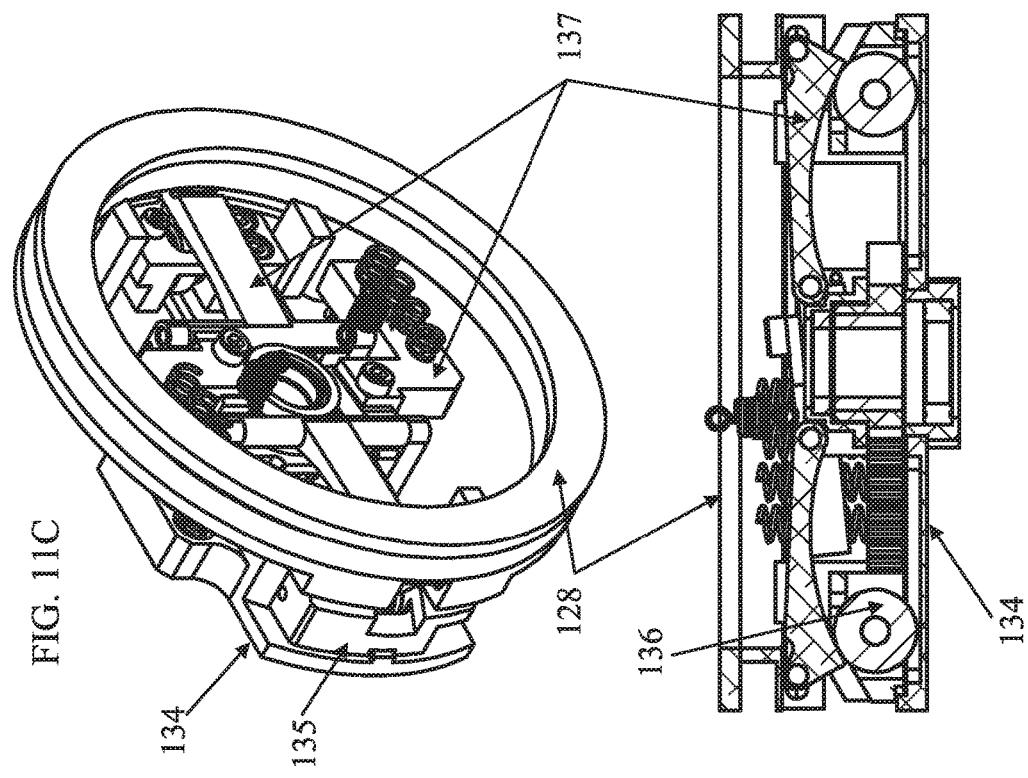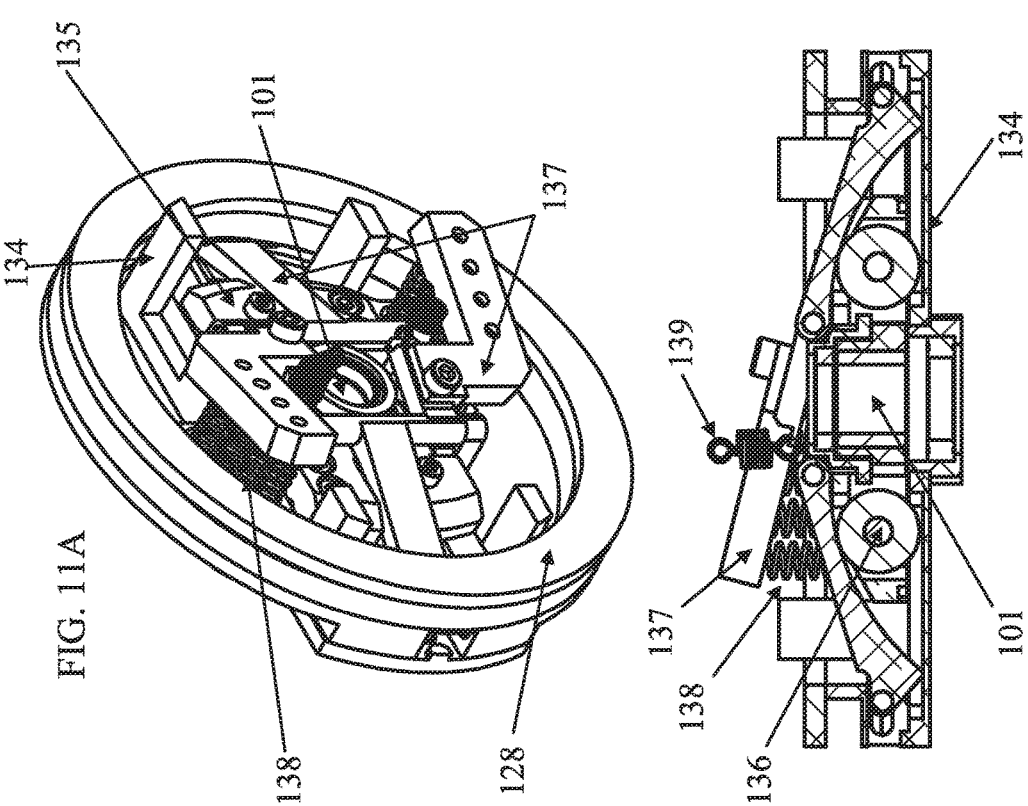

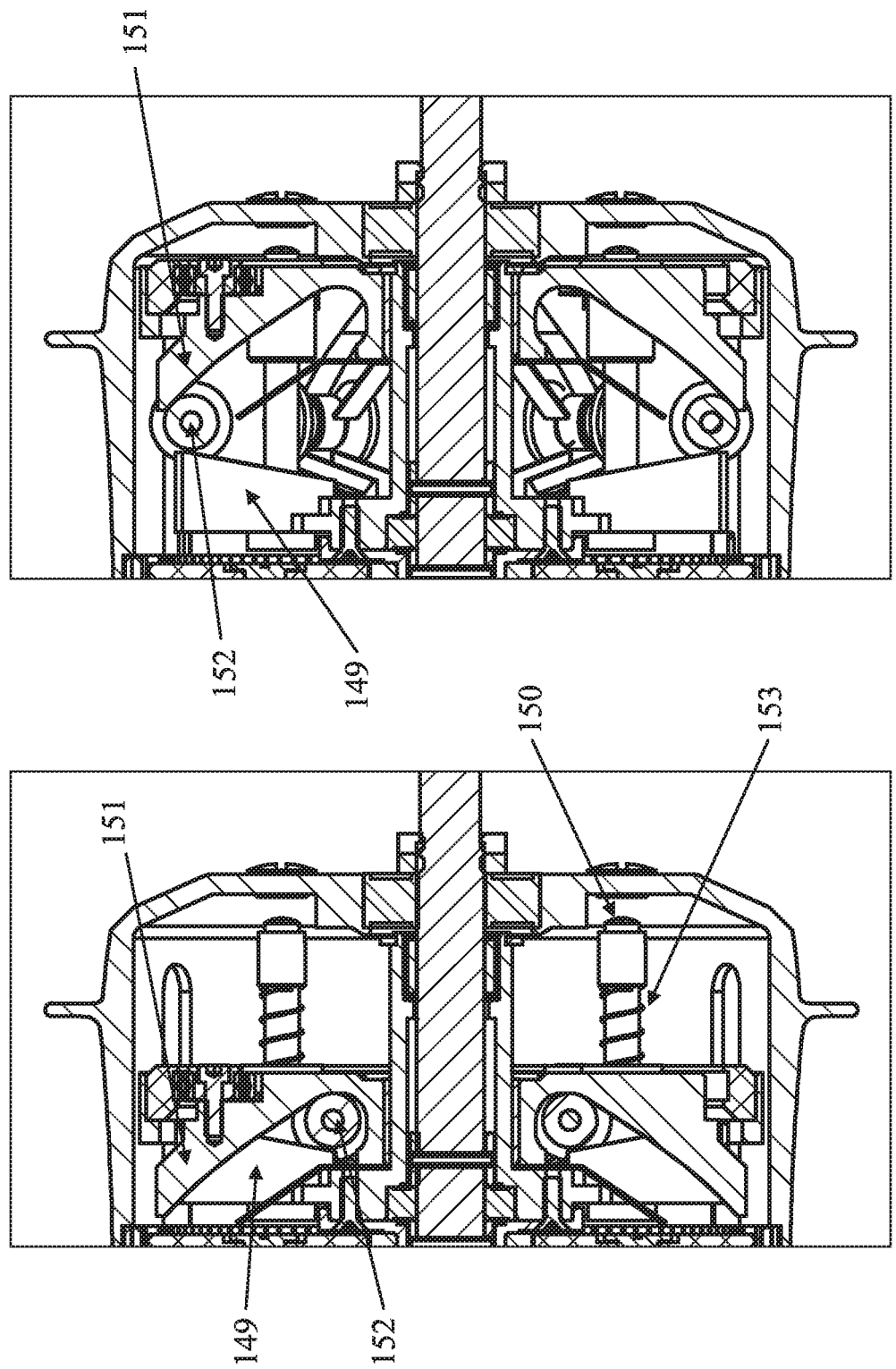

HUB GEAR

RELATED APPLICATION

This application claims the benefit of priority under 35 USC § 119(e) of U.S. Provisional Patent Application No. 62/318,347 filed on Apr. 5, 2016, the contents of which are incorporated herein by reference in their entirety.

FIELD AND BACKGROUND OF THE INVENTION

The present invention, in some embodiments thereof, relates to a hub gear and, more particularly, but not exclusively, to a multi-speed hub gear where the transmission ratio is changed by engaging one planetary gear set while disengaging another planetary gear set rotating in conjunction.

A conventional speed-changing transmission hub uses a planetary gear train comprising ring gears, rotating gears and central gears. Torque is inputted to the planetary gear train either via the ring gear or the carrier of the rotating gears, as controlled by a clutch, which engages either with the ring gear or with the carrier, thus controlling the path of torque within the planetary gear train and the degrees of freedom of the sun gears for various speeds.

SUMMARY OF THE INVENTION

According to an aspect of some embodiments of the present invention there is provided a multi-speed hub gear, comprising: an axle adapted to be fixed against rotation; a hub shell; a plurality of planetary gear sets, each comprising: a central gear concentrically fixed on the axle; a rotating gear carrier mounting at least one rotating gear to revolve around the center of the central gear; and a ring gear rotated by the at least one rotating gear; wherein a respective the ring gear of one of the plurality of planetary gear sets is mechanically connected to a respective the rotating gear carrier of another of the plurality of planetary gear sets such that the plurality of planetary gear sets rotate in conjunction; and a gear shifter adapted to engage at least one of the plurality of planetary gear sets to the hub shell while disengaging another of the plurality of planetary gear sets from the hub shell. Each planetary gear set is rotating at a different speed, so this allows shifting gears under load, by transferring the load to a planetary gear set which is rotating at a correct speed.

Optionally, the gear shifter includes at least one linear actuator having a motion axis parallel to the axle and the engaging and disengaging of the plurality of planetary gear sets from the hub shell is done by a linear motion of the at least one linear actuator along the motion axis.

More optionally, the at least one linear actuator includes a plurality of non-linear slits, each laterally positioning a pin in a position of where the pin is engaging one of the planet carriers to the hub shell and in a position of where the pin is disengaging the one of the planet carriers from the hub shell.

Optionally, the engaging and disengaging includes simultaneously disengaging a planet carrier of one of the plurality of planetary gear sets and engaging a planet carrier of a next one of the plurality of planetary gear sets.

Optionally, the plurality of planetary gear sets have the same transmission ratio.

Optionally, the plurality of planetary gear sets are having different transmission ratios.

Optionally, the engaging and disengaging further includes partly disengaging at least one of the plurality of planetary gear sets so the at least one of the plurality of planetary gear sets rotates freely at a lower speed relative to the hub shell.

Optionally, the multi-speed hub gear further comprises a plurality of lockable bearings, each concentrically mounted between one of the ring gears and the hub shell; wherein the engaging and disengaging is done by changing position of at least one of the plurality of lockable bearings between a locked position where a plurality of rollers of the lockable bearing are locked and an unlocked position where the plurality of rollers are not locked and are free to rotate.

More optionally, the engaging and disengaging further includes partly engaging at least one of the plurality of planetary gear sets by changing position at least one of the plurality of lockable bearings to a partly unlocked position where a plurality of rollers of the lockable bearing are allowed to be locked by the outer one-way ring and the lockable bearing operates as a one-way bearing.

More optionally, each of the plurality of lockable bearings includes an outer one-way ring and two ring cage plates which includes a plurality of depressions loosely holding the plurality of rollers between the two ring cage plates; wherein the ring cage plates rotate relative to the one-way ring and moves the plurality of rollers between the locked position where the plurality of rollers are locked by the outer one-way ring, and the unlocked position wherein the plurality of rollers are not locked by the outer one-way ring.

More optionally, each of the plurality of rollers is pushed into locked position by a spring against angled surface of the outer one-way ring.

More optionally, the two ring cage plates are rotated by a pin fixed to one of the two ring cage plates, the pin is laterally shifted to different positions by the at least one linear actuator.

Optionally, the gear shifter is activated by a governor according to a turning speed of the hub shell.

More optionally, the governor includes a drive plate which pushes the gear shifter when turning speed of the governor increases.

More optionally, the governor includes a return spring which pulls the drive plate to an initial position when turning speed of the governor decreases More optionally, the governor includes at least one counterweight having an initial position close to the axle, the at least one counterweight is pushed away from the axle by centrifugal force applied when turning speed of the governor increases.

More optionally, the at least one counterweight pushes a drive plate which pushes the gear shifter when turning speed of the governor increases.

More optionally, the at least one counterweight pushes at least one pushing flap mechanically connected to the at least one counterweight, the at least one pushing flap pushes a drive plate which pushes the gear shifter when turning speed of the governor increases.

More optionally, the governor includes a governor planetary gear set, the governor planetary gear set comprising: a governor rotating gear carrier fixed on the axle and mounting at least one governor rotating gear; a governor ring gear concentrically fixed to the hub shell; and a governor central gear mechanically connected to a governor base so the governor base turns faster than the hub shell.

More optionally, the governor includes at least one speed sensor and at least one motor electronically connected to the at least one speed sensor and activates the gear shifter.

Optionally, the multi-speed hub gear further comprises: a double one-way bearing mechanism which drives the hub shell.

More optionally, the double one-way bearing mechanism includes: a first one-way bearing connecting a sprocket to a first rotating gear carrier of a first of the plurality of planetary gear sets so the sprocket drives the first planetary gear set; and a second one-way bearing connecting the first rotating gear carrier to the hub shell, so sprocket also drives the hub shell.

More optionally, the at least one of the first one-way bearing and the second one-way bearing includes a trapped roller mechanism.

More optionally, the at least one of the first one-way bearing and the second one-way bearing includes a sprag clutch mechanism.

More optionally, the at least one of the first one-way bearing and the second one-way bearing includes a ratchet mechanism.

Optionally, the multi-speed hub gear is used in a wheeled vehicle, wherein the axle is adapted to be fixed against rotation in a wheel holder of a wheeled vehicle frame and the hub shell is mechanically connected to a wheel.

According to an aspect of some embodiments of the present invention there is provided a method of changing transmission ratio in a multi-speed hub gear, comprising: monitoring turning speed of a hub shell of the multi-speed hub gear relative to an axle adapted to be fixed against rotation; shifting a gear shifter according to the monitored speed; engaging at least one of a plurality of planetary gear sets to the hub shell, each of the plurality of planetary gear sets comprising: a central gear concentrically fixed on the axle; a rotating gear carrier mounting at least one rotating gear to revolve around the center of the central gear; and a ring gear rotated by the at least one rotating gear; wherein a respective the ring gear of one of the plurality of planetary gear sets is mechanically connected to a respective the rotating gear carrier of another of the plurality of planetary gear sets such that the plurality of planetary gear sets rotate in conjunction; and disengaging another one of the plurality of planetary gear sets from the hub shell.

According to an aspect of some embodiments of the present invention there is provided a multi-speed hub gear, comprising: an axle adapted to be fixed against rotation; a hub shell; a plurality of planetary gear sets, each comprising: a central gear concentrically fixed on the axle; a rotating gear carrier mounting at least one rotating gear to revolve around the center of the central gear; and a ring gear rotated by the at least one rotating gear; and a gear shifter adapted to engage at least one of the plurality of planetary gear sets to the hub shell while disengaging another of the plurality of planetary gear sets from the hub shell; wherein the gear shifter includes at least one linear actuator having a motion axis parallel to the axle and the engaging and disengaging of the plurality of planetary gear sets from the hub shell is done by a linear motion of the at least one linear actuator along the motion axis.

According to an aspect of some embodiments of the present invention there is provided a multi-speed hub gear, comprising: an axle adapted to be fixed against rotation; a hub shell; a plurality of planetary gear sets, each comprising: a central gear concentrically fixed on the axle; a rotating gear carrier mounting at least one rotating gear to revolve around the center of the central gear; and a ring gear rotated by the at least one rotating gear; and a plurality of lockable bearings, each concentrically mounted between one of the planet carriers and the hub shell; wherein the engaging and disengaging is done by changing position of at least one of the plurality of lockable bearings between a locked position where a plurality of rollers of the lockable bearing are locked and an unlocked position where the plurality of rollers are not locked and are free to rotate.

According to an aspect of some embodiments of the present invention there is provided a multi-speed hub gear, comprising: an axle adapted to be fixed against rotation; a hub shell; a plurality of planetary gear sets, each comprising: a central gear concentrically fixed on the axle; a rotating gear carrier mounting at least one rotating gear to revolve around the center of the central gear; and a ring gear rotated by the at least one rotating gear; a gear shifter adapted to engage at least one of the plurality of planetary gear sets to the hub shell while disengaging another of the plurality of planetary gear sets from the hub shell; and a governor monitoring a turning speed of the hub shell and activating the gear shifter according to the turning speed.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A and 3B are a cross-section illustration of a double one-way bearing mechanism of the multi-speed hub gear of FIG. 1 and a magnified view thereof, respectively, according to some embodiments of the present invention;

FIGS. 5A and 5B are a cross-section illustration of the first planetary gear set of the multi-speed hub gear of FIG. 1 and a magnified view thereof, respectively, according to some embodiments of the present invention;

FIGS. 9A, 9B, 9C and 9D are illustrations of a side view of an exemplary position of the linear actuators and section views of the planetary gear sets, respectively, according to some embodiments of the present invention;

FIG. 11A and FIG. 11B are illustrations of the governor of the multi-speed hub gear of FIG. 1 in low speed and FIG. 11C and FIG. 11D are illustrations of the governor in high speed, according to some embodiments of the present invention;

FIG. 15A is an illustration of a cross section of the governor of FIG. 14C at low speed, according to some embodiments of the present invention;

FIG. 15B is an illustration of a cross section of the governor of FIG. 14C at high speed, according to some embodiments of the present invention;

DESCRIPTION OF SPECIFIC EMBODIMENTS OF THE INVENTION

Figure 1:
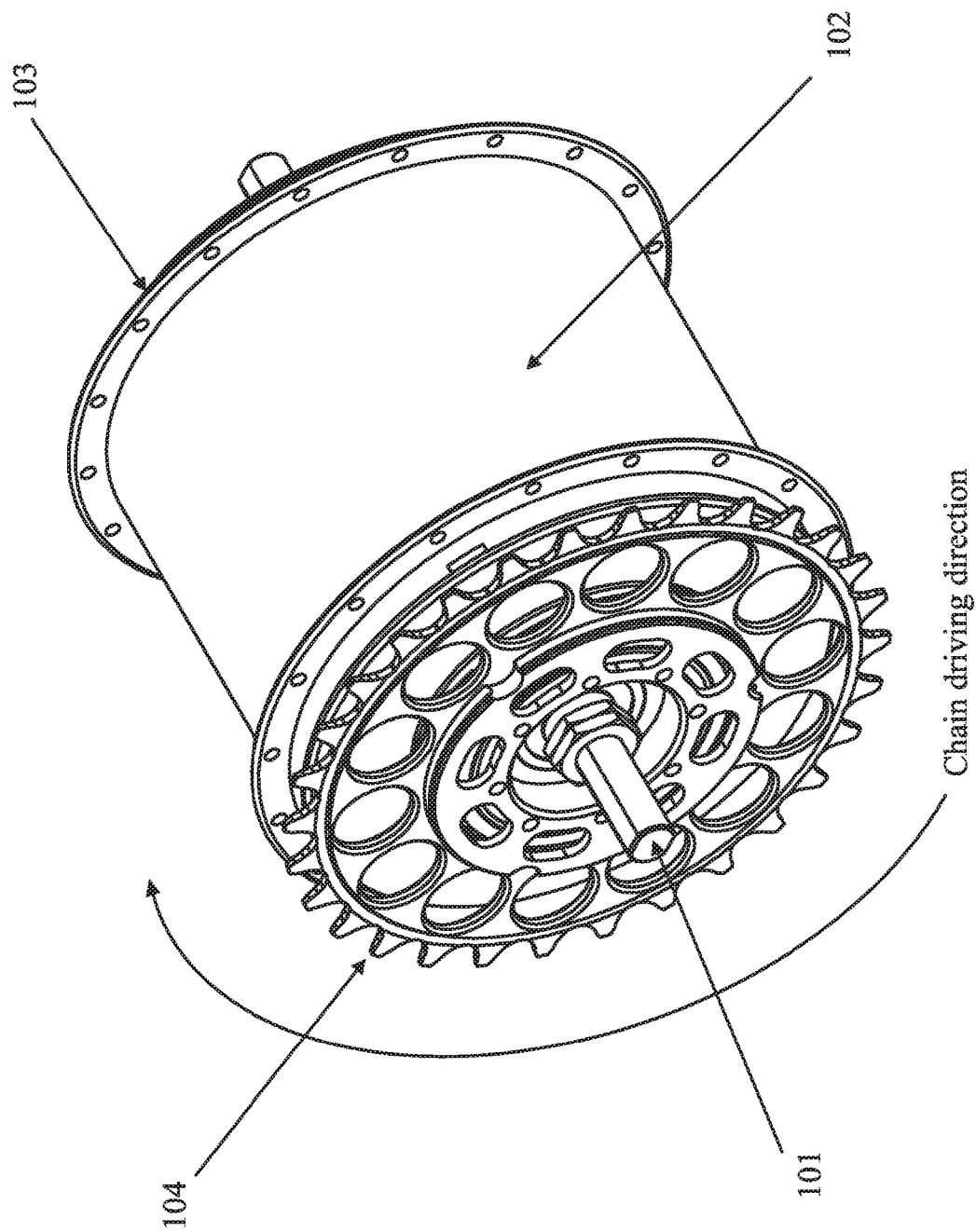
FIG. 1 is an illustration of a multi-speed hub gear for a wheeled vehicle, according to some embodiments of the present invention.

The present invention, in some embodiments thereof, relates to a hub gear and, more particularly, but not exclusively, to a multi-speed hub gear where the transmission ratio is changed by engaging one planetary gear set while disengaging another planetary gear set rotating in conjunction.

According to some embodiments of the present invention, there is provided a multi-speed hub gear. The multi-speed hub gear may be used for a wheeled vehicle, for example a bicycle or a tricycle operated by pedaling or by an electric engine. The multi-speed hub gear may also be used for water or wind turbines, locking mechanisms, production machinery and/or any other use requiring a small efficient automatic gear. The multi-speed hub gear includes multiple planetary gear sets and optionally a gear shifting mechanism for converting force, such as a centrifugal force, to a gear shifter action. The planetary gear sets are connected to each other and rotate in conjunction, each at a different speed (each planetary gear set rotates faster than its predecessor). The gear shifting mechanism transfers the load from one planetary gear set to another by engaging it to the hub shell.

Optionally, each of the planetary gear sets includes a central gear concentrically fixed on an axle of the hub gear, a rotating gear carrier mounting rotating gears, for example two or three, and a ring gear rotated by the rotating gears. Optionally, all planetary gear sets are arranged to rotate in conjunction, with a ratio between them. For example, a ring gear of one of the planetary gear sets is mechanically connected a rotating gear carrier of another of the planetary gear sets. When the turning speed of the hub gear increases, the gear shifter, for example one or more linear actuators having a motion axis parallel to the axle, engage one or more of the planetary gear sets to the hub shell of the hub gear while disengaging another planetary gear set from the hub shell. Optionally, the gear shifter is operated based on centrifugal force.

Optionally, for the initial speed, none of the planetary gear sets is engaged, and a sprocket drives the hub shell directly, optionally via a double one-way bearing mechanism which also drives the first planetary gear set.

For the higher speeds, the planetary gear sets are alternately engaged and drive the hub shell. Optionally, each of the planetary gear sets is connected to the hub shell via a lockable bearing concentrically mounted between the planetary gear set and the hub shell. Each lockable bearing has a locked position, where rollers of the lockable bearing are locked so the planetary gear set drives the hub shell, and an unlocked position where the rollers of the lockable bearing are not locked and are free to rotate so the planetary gear set does not drive the hub shell. Optionally, the lockable bearings are one-way bearings and planetary gear sets of lower speeds are only partially disengaged and are still connected to the hub shell but do not drive the hub shell.

Optionally, the monitoring of the turning speed of the hub gear and the shifting of the gear shifter is done by a governor mechanism. The governor mechanism may include counterweights movable by centrifugal force created by the turning speed of the hub gear, and a drive plate pushed by the counterweights which shifts the gear shifter.

The multi-speed hub gear, according to some embodiments of the present invention, is a fully automatic internal hub gear, which may be shifted up and down under load. Also, the hub gear may be used by both electric and non-electric wheeled vehicle, and shifting may be controlled by manual shifters, electronic shifters and/or any other internal or external means.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is an illustration of a multi-speed hub gear 100 for a wheeled vehicle, such as a bicycle which includes multiple planetary gear sets rotating in conjunction and a gear shifter adapted to engage one set to a hub shell while disengaging another set, according to some embodiments of the present invention. Multi-speed hub gear 100 may be for example of a length 135 millimeters (to fit an Over Lockout Distance which is conventional in the bicycle industry) and 105 millimeters in diameter. It may fit any wheeled vehicle frame that supports such length and a horizontal dropout.

Multi-speed hub gear 100 includes an axle 101 adapted to be fixed against rotation in a wheel holder of a wheeled vehicle frame, by a mechanical connection of each end of axle 101. Multi-speed hub gear 100 also includes a hub shell 102 having spoke mounts 103 for mechanically connecting a plurality of spokes of a wheel. Hub shell 102 is concentric to axle 101 and rotates the wheel by applying force on the spokes. Hub shell 102 is rotated by a sprocket 104, which is concentrically mounted on axle 101, via the internal gear mechanism of the hub gear. Sprocket 104 is driven by a chain that may be driven by pedals of the wheeled vehicle and/or a motor.

Figure 2A:
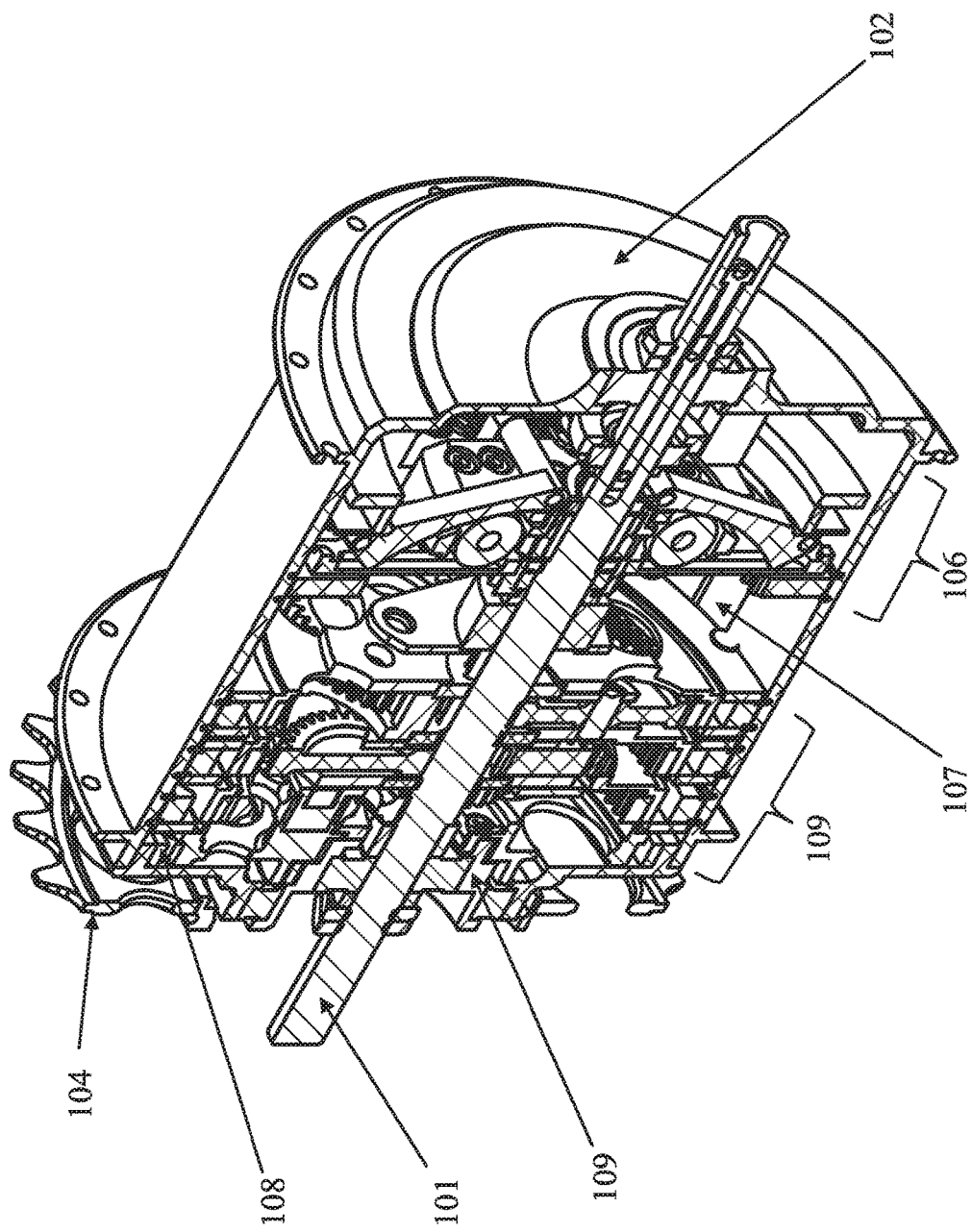
FIGS. 2A and 2B are cross-section illustrations of the multi-speed hub gear of FIG. 1, according to some embodiments of the present invention.
Figure 2B:
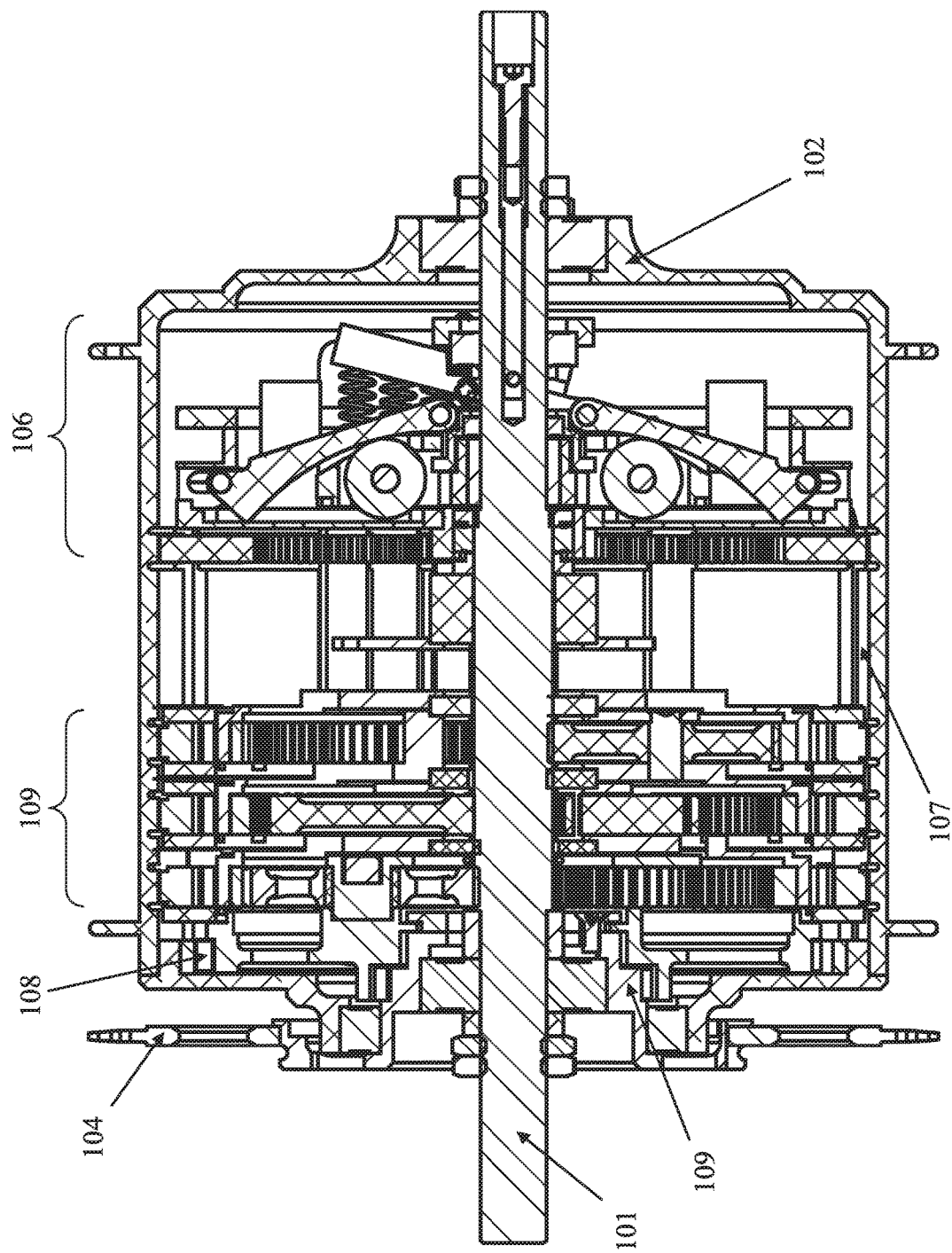

Reference is now made to FIGS. 2A and 2B, which are cross-section illustrations of multi-speed hub gear 100, according to some embodiments of the present invention.

Hub gear 100 includes multiple planetary gear sets. The planetary gear sets may have the same transmission ratio or have different transmission ratios. According to some embodiments as shown in the drawings, hub gear 100 includes three planetary gear sets 109, providing three different transmission ratios when operating. Optionally, hub gear 100 includes any number of planetary gear sets, for example, 4, 5, 10 or 12 planetary gear sets. Planetary gear sets 109 are positioned concentrically around axle 101, one next to the other. Exemplary dimensions of hub gear 100 may be, for example, a diameter of 127 millimeters and a length of 134 millimeters.

When sprocket 104 is driven at different speeds, the transmission ratio between sprocket 104 and hub shell 102 is changed. For example, rotational speed may increase between 15% and 30% when shifting from one planetary gear set to another. The change of transmission ratio is controlled by a governor 106, by shifting a gear shifter that engages one planetary gear set to a hub shell while disengaging another planetary gear set. Optionally, the gear shifter includes linear actuators 107, having a motion axis parallel to axle 101 and move along the motion axis to engage and disengage planetary gear sets 109. Optionally, linear actuators 107 are rotated along with hub shell 102.

For the initial speed, none of planetary gear sets 109 is engaged, and sprocket 104 drives hub shell 102 directly, optionally via a double one-way bearing mechanism 108. For the second, third and fourth speeds, planetary gear sets 109 are alternately engaged and driving hub shell 102.

Reference is now made to FIGS. 3A and 3B, which are views of a cross-section illustration of a double one-way bearing mechanism 108 of multi-speed hub gear 100, according to some embodiments of the present invention. Sprocket 104 is mechanically connected to a sprocket sleeve 110, which is also concentrically positioned around axle 101. An outer surface of sprocket sleeve 110 includes angled surfaces 111 that are acting as the inner part of a one-way bearing mechanism. The angle of angled surfaces 111 may be, for example, 7 degrees.

The one-way bearing mechanism includes rollers 112 which are positioned between angled surfaces 111 of sprocket sleeve 110 and an inner surface of a wheel element, which is the first rotating gear carrier 113 of the first planetary gear set. The one-way bearing mechanism includes, for example, 6, 18, 30 and/or any number of rollers, depending on the diameter of hub gear 100. When sprocket 104 and sprocket sleeve 110 are rotated faster than first rotating gear carrier 113, rollers 112 are pushed to a narrow space between angled surfaces 111 and first rotating gear carrier 113, and sprocket sleeve 110 locks to first rotating gear carrier 113 and turns it. When sprocket 104 and sprocket sleeve 110 are rotated slower or to the other direction than first rotating gear carrier 113, rollers 112 are pushed to a wide space between angled surfaces 111 and first rotating gear carrier 113, then rollers 112 are free to rotate, allowing freewheel motion of sprocket sleeve 110.

An outer surface of first rotating gear carrier 113 also includes angled surfaces, similar to angled surfaces 111, which are acting as the inner part of a second one-way bearing mechanism. The second one-way bearing mechanism also includes rollers 114, located between first rotating gear carrier 113 and hub shell 102. The second one-way bearing mechanism operates in a similar way, so when first rotating gear carrier 113 rotated faster than hub shell 102, rollers 114 are locked and first rotating gear carrier 113 drives hub shell 102. Therefore, at the first speed of sprocket 104, sprocket sleeve 110 drives first rotating gear carrier 113, which drives both hub shell 102 and the first planetary gear set.

Alternatively, other mechanisms may be used as alternatives to trapped rollers for each one-way bearing of double one-way bearing mechanism 108, for example a sprag clutch and/or a ratchet mechanism.

Figure 4:
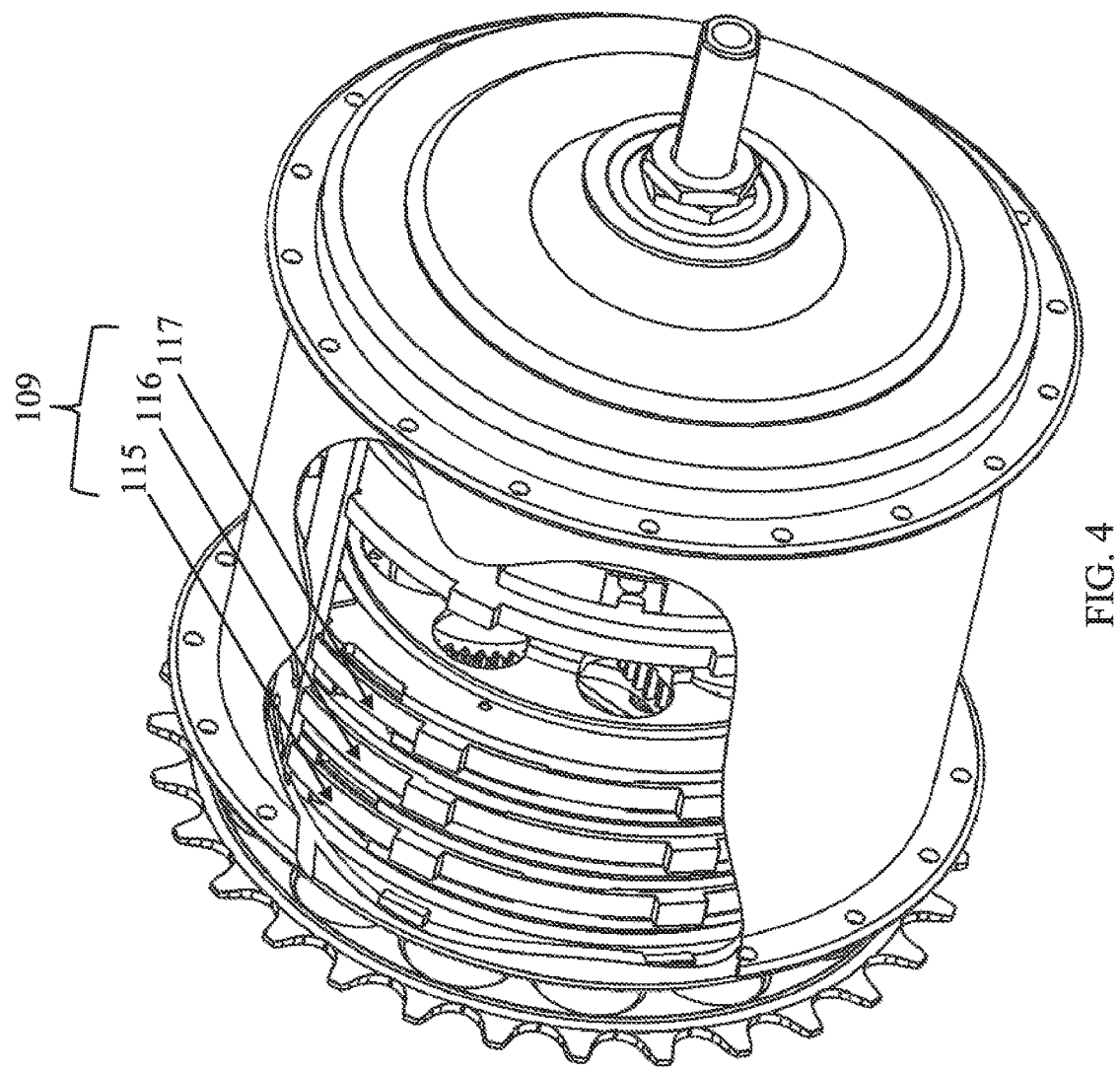
FIG. 4 is an illustration of the multi-speed hub gear of FIG. 1 wherein the planetary gear sets are visible, according to some embodiments of the present invention.

Reference is now made to FIG. 4, which is an illustration of multi-speed hub gear 100 wherein planetary gear sets 109 are visible, according to some embodiments of the present invention. Planetary gear sets 109 include a first planetary gear set 115, a second planetary gear set 116 and a third planetary gear set 117. Reference is also made to FIGS. 5A and 5B, which are views of a cross-section illustration of first planetary gear set 115 of multi-speed hub gear 100, according to some embodiments of the present invention. Second planetary gear set 116 and third planetary gear set 117 are of similar structure.

First planetary gear set 115 includes a central gear 118 concentrically fixed on axle 101, first rotating gear carrier 113 which mounts multiple rotating gears 119 that revolve around the center of central gear 118 and a ring gear 120 rotated by rotating gears 119. Ring gear 120 is mechanically connected to a second rotating gear carrier 121 of second planetary gear set 116. In a similar way, a second ring gear of second planetary gear set 116 is mechanically connected to a third rotating gear carrier of third planetary gear set 117. Therefore, planetary gear sets 109 are rotating in conjunction. Because each ring gear is mechanically connected to the next rotating gear carrier, the motion is transferred through the planetary gear sets, and each planetary gear set increases the rotation speed of the next planetary gear set. The increase may be, for example, 10%, 25%, 20% and/or any other increase.

Optionally, each of planetary gear sets 109 is connected to hub shell 102 via a lockable bearing concentrically mounted between the planetary gear set and hub shell 102. The outer surface of the rotating gear carrier of each planetary gear set is operating as the inner surface of each lockable bearing. Each lockable bearing has a locked position, where the rollers of the lockable bearing are locked and an unlocked position where the rollers of the lockable bearing are not locked and are free to rotate. The lockable bearing may include, for example, 6, 18, 30 and/or any number of rollers, depending on the diameter of hub gear 100. Optionally, each lockable bearing has a partly unlocked position, where the rollers of the lockable bearing are partly unlocked and the lockable bearing operates as a one-way bearing. When a lockable bearing is in a locked position, the respective planetary gear set is engaged, and the respective rotating gear carrier drives hub shell 102.

When a lockable bearing is in an unlocked position, the respective planetary gear set is disengaged, and the respective rotating gear carrier is rotating freely relative to hub shell 102. When a lockable bearing is in a partly unlocked position, the respective planetary gear set is partly engaged, so the lockable bearing operates in a similar way to the first and second one-way bearings of double one-way bearing mechanism 108. When the respective planetary gear set is rotating faster than hub shell 102, the respective rotating gear carrier drives hub shell 102, and when hub shell 102 is rotating faster than the respective planetary gear set, the respective rotating gear carrier is rotating freely relative to hub shell 102.

Figure 6:
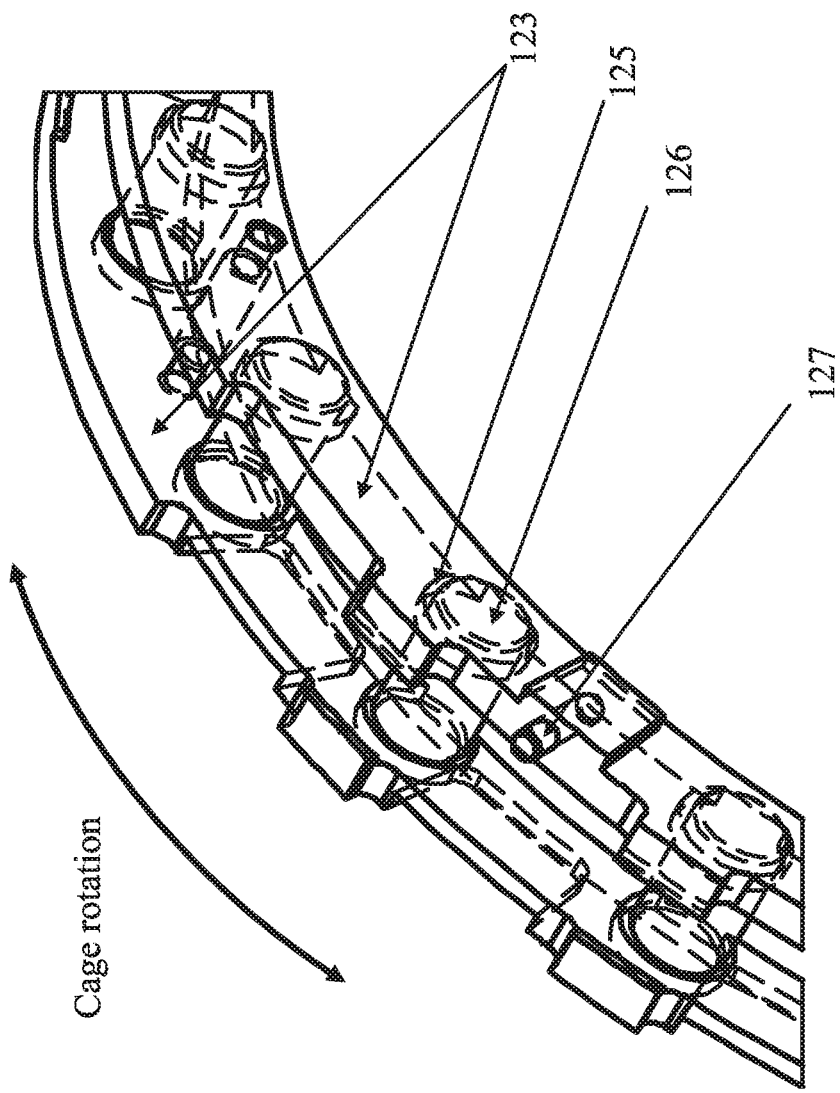
FIG. 6 is an illustration of two ring cage plates of a lockable bearing holding rollers, according to some embodiments of the present invention.

Optionally, each of the lockable bearings, for example the first lockable bearing connecting first planetary gear set 115 to hub shell 102, includes an outer one-way ring 122 and two ring cage plates 123. The inner surface of outer one-way ring 122 includes angled surfaces 124, similar to angled surfaces 111. The angle of angled surfaces 124 may be, for example, 7 degrees. Ring cage plates 123 include multiple depressions 125 loosely holding multiple rollers 126 between two ring cage plates 123. Reference is now made to FIG. 6, which is an illustration of two ring cage plates 123 of a lockable bearing holding rollers 126, according to some embodiments of the present invention. The diameter of depressions 125 is larger by a small amount from the diameter of rollers 126 so that rollers 126 are held loosely. For example, the diameter of depressions 125 is 6 millimeters and the diameter of rollers 126 is 5 millimeters.

When ring cage plates 123 are moved counterclockwise relative to outer one-way ring 122, rollers 126 are in locked position and are locked by outer one-way ring 122. In this position, first planetary gear set 115 is engaged to hub shell 102. When ring cage plates 123 are moved clockwise relative to outer one-way ring 122, rollers 126 are in unlocked position and first planetary gear set 115 is disengaged from hub shell 102. When ring cage plates 123 are moved slightly clockwise relative to outer one-way ring 122, rollers 126 are in partly unlocked position and first planetary gear set 115 is partly engaged to hub shell 102, via a one-way bearing mechanism.

Figure 7:
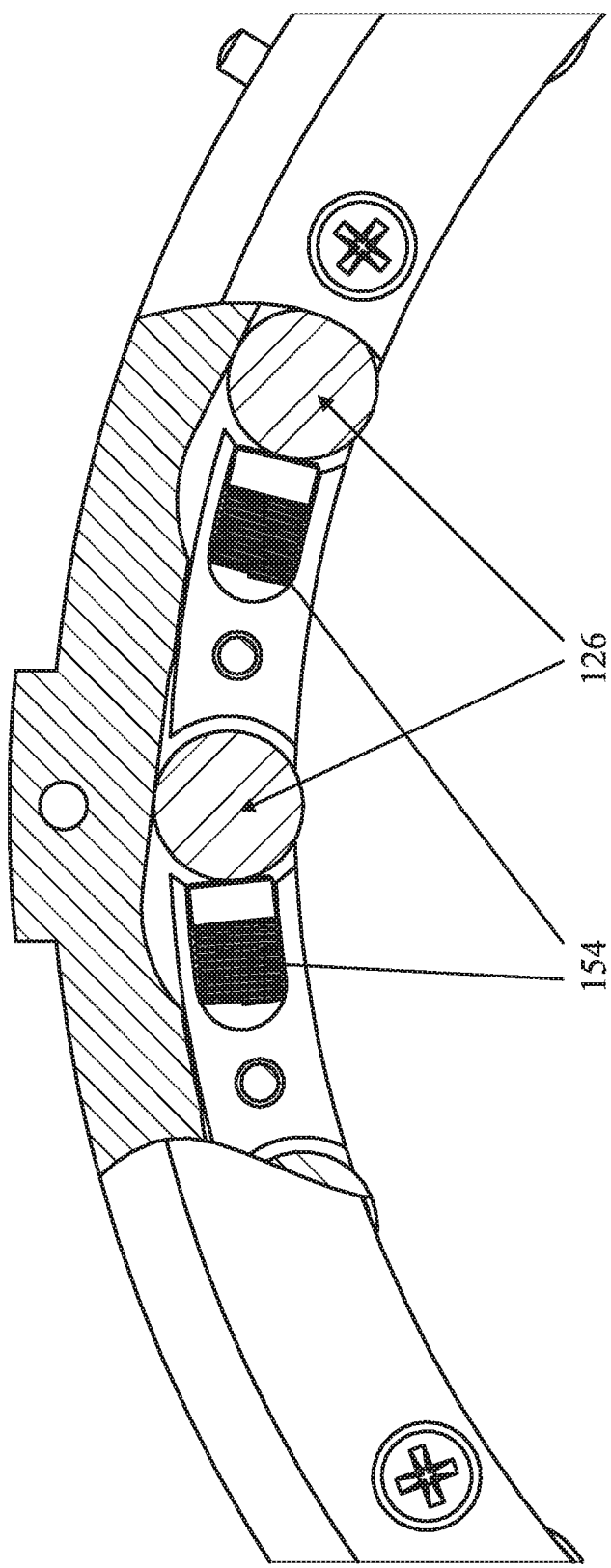
FIG. 7 is an illustration of ring cage plates with spring loaded rollers, according to some embodiments of the present invention.

Optionally, rollers 126 are pushed by springs. Reference is now made to FIG. 7, which is an illustration of ring cage plates with spring loaded rollers, according to some embodiments of the present invention. Springs 154 constantly pushes rollers 126 against the angled surface of outer one-way ring 122. The purpose is to ensure rollers 126 always reach the locked position.

Optionally, two ring cage plates 123 are rotated by a pin 127 which is fixed to one ring cage plate 123. Pin 127 is laterally shifted to different positions by one of linear actuators 107.

Figure 8:
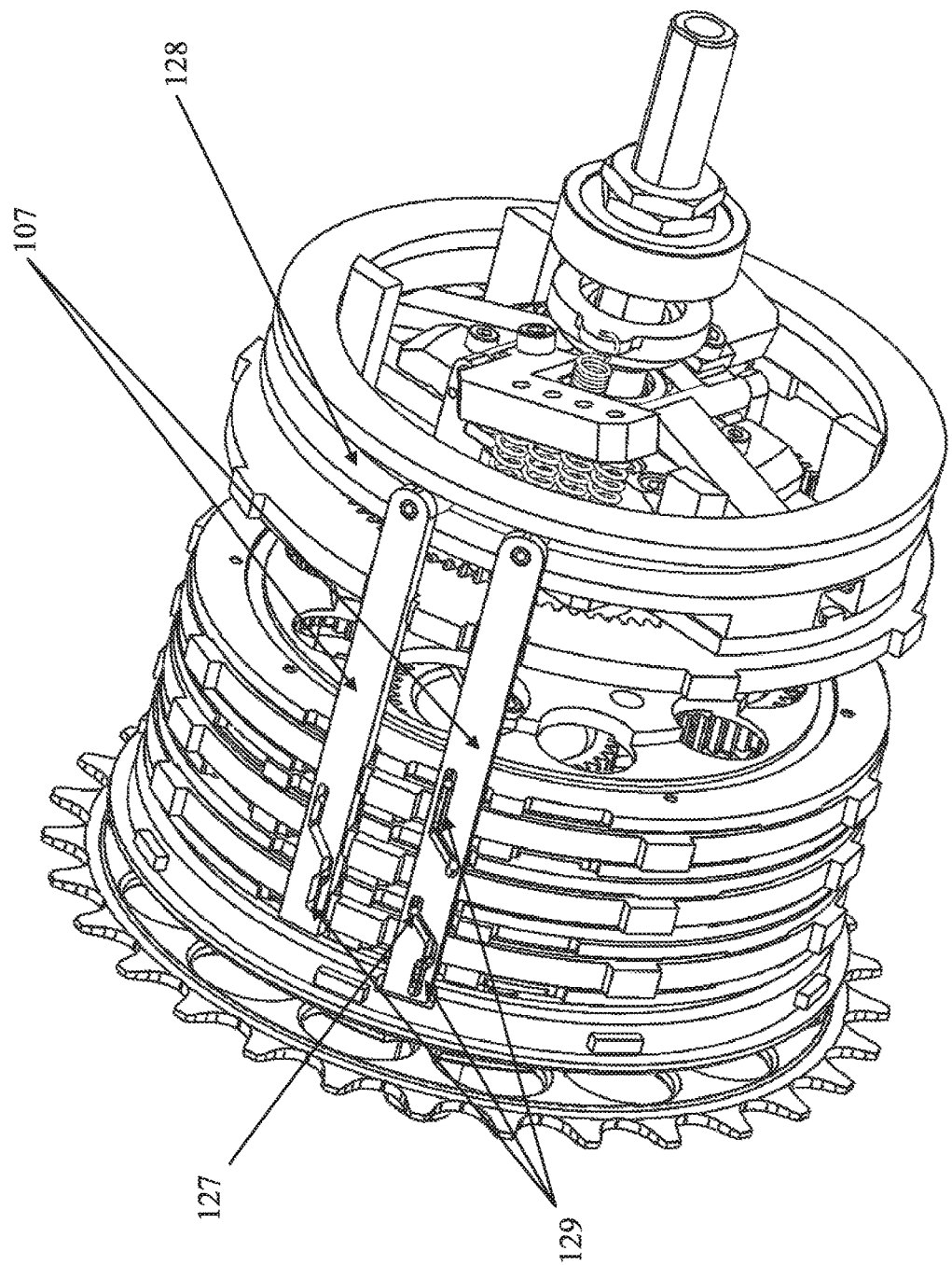
FIG. 8 is an illustration of the multi-speed hub gear of FIG. 1 wherein the linear actuators are visible, according to some embodiments of the present invention.

Reference is now made to FIG. 8, which is an illustration of multi-speed hub gear 100 wherein linear actuators 107 are visible, according to some embodiments of the present invention. Linear actuators 107 may include one, two, four or any number of linear actuators. Optionally, similar linear actuators are positioned on opposite sides of hub shell 102, so the mechanism is balanced during operation. Linear actuators 107 are moved by a drive plate 128 of governor 106 by pushing and pulling along the motion axis of linear actuators 107. Linear actuators 107 are adjacent to hub shell 102 and are rotated with hub shell 102 around axle 101. Linear actuators 107 includes non-linear slits 129, each laterally positioning a pin between a position of where the pin is engaging one of planetary gear sets 109 to hub shell 102 and a position of where the pin is disengaging the same one of planetary gear sets 109 from hub shell 102.

Reference is now made to FIGS. 9A, 9B, 9C and 9D, which are illustrations of side views of an exemplary position of linear actuators 107, according to some embodiments of the present invention. The position of linear actuators 107 is shown on 901. In this example, linear actuators 107 are positioned so pin 127 of first planetary gear set 115 is positioned in a middle position by a slit 129, so ring cage plates 123 are moved slightly clockwise relative to outer one-way ring 122, as shown in 902. Optionally as shown in this example, in this position, first planetary gear set 115 is partly engaged. The second pin of second planetary gear set 116 is positioned in a leftward position by a slit 129, as shown in 903, so the second ring cage plates are moved counterclockwise relative to the second outer one-way ring and second planetary gear set 116 is engaged to hub shell 102. The third pin of third planetary gear set 117 is positioned in a rightward position by a slit 129, as shown in 904, so the third ring cage plates are moved clockwise relative to the third outer one-way ring and third planetary gear set 117 is disengaged from hub shell 102.

Reference is now made to FIGS. 10A, 10B, 10C and 10D, which are illustrations of a side view of different positions of linear actuators 107, according to some embodiments of the present invention. For each speed of hub gear 100, a next planetary gear set is engaged, the one before it is left partly engaged, and the rest of the planetary gear sets are disengaged. Leaving the last planetary gear set partly engaged helps in reducing friction and noise of gear hub 100 during operation.

Figure 10A:
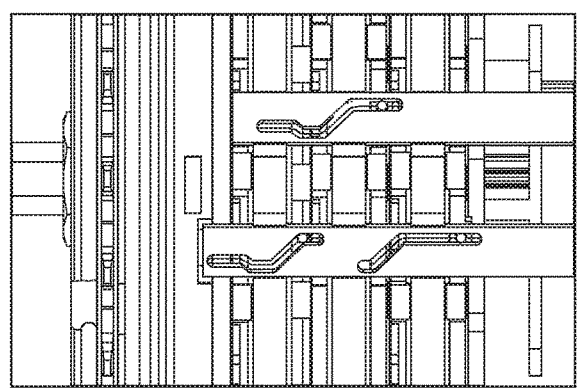
FIGS. 10A, 10B, 10C and 10D are illustrations of a side view of different positions of the linear actuators, according to some embodiments of the present invention.

FIG. 10A shows the position of linear actuators 107 for the first speed of hub gear 100. In this position, all pins are at a rightward position so planetary gear sets 109 are all disengaged and sprocket 104 drives hub shell 102 directly.

Figure 10B:
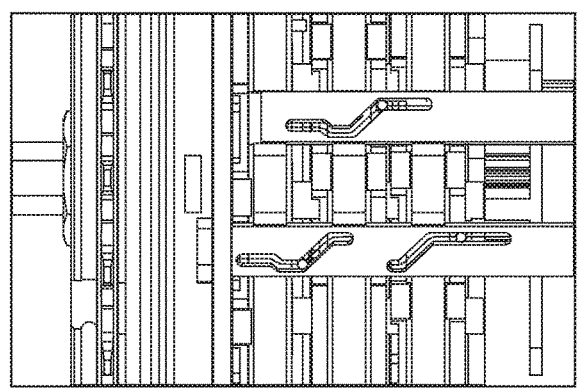

FIG. 10B shows the position of linear actuators 107 for the second speed of hub gear 100. In this position, pin 127 is in a leftward position so first planetary gear set 115 is engaged and drives hub shell 102, while the other planetary gear sets are disengaged.

Figure 10C:
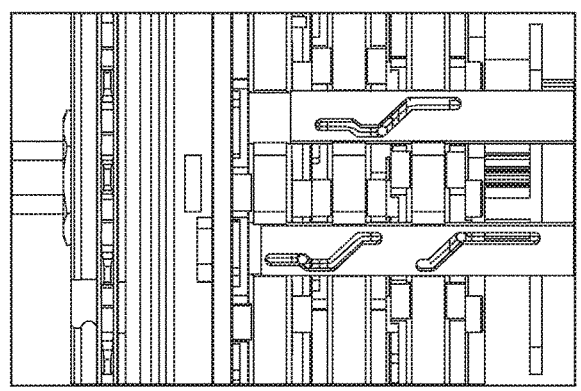

FIG. 10C shows the position of linear actuators 107 for the third speed of hub gear 100. In this position, the second pin is in a leftward position so second planetary gear set 116 is engaged and drives hub shell 102. Pin 127 is in a middle position so first planetary gear set 115 is partly engaged, and it only drives hub shell 102 when hub shell 102 is rotated in a slower speed than ring gear 120.

Figure 10D:
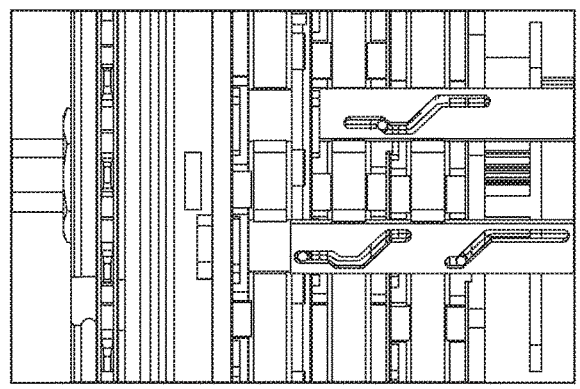

FIG. 10D shows the position of linear actuators 107 for the fourth speed of hub gear 100. In this position, the third pin is in a leftward position so third planetary gear set 117 is engaged and drives hub shell 102. The second pin is in a middle position so second planetary gear set 116 is partly engaged and Pin 127 is in a middle position so first planetary gear set 115 is partly engaged.

Reference is now made to FIG. 11A and FIG. 11B, which are illustrations of a governor 106 of multi-speed hub gear 100 in low speed and to 11C and FIG. 11D, which are illustrations of a governor 106 in high speed, according to some embodiments of the present invention. Governor 106 activates linear actuators 107 according to a turning speed of hub shell 102, monitored by governor 106. Optionally, the monitoring of the turning speed of hub shell 102 is done by the centrifugal force created by the turning.

Optionally, governor 106 includes counterweights 135 that may move outward from axle 101 to hub shell 102 in response to centrifugal force. Governor 106 may include one, two, four or any number of counterweights 135. Optionally, similar counterweights are positioned on opposite sides of governor 106, so the mechanism is balanced during operation. As shown in FIG. 11A and FIG. 11B, at none or low speeds, counterweights 135 are positioned close to axle 101. When the turning speed is increased, centrifugal force is created and pushes counterweights 135 outward from axle 101 to hub shell 102, as shown in FIG. 11C and FIG. 11D.

Optionally, counterweights 135 are mechanically connected to weighted bearings 136, which are moved outward along with counterweights 135 when the speed increases. Weighted bearings 136 are pushing flaps 137 which are then pushing drive plate 128 along the axis of axle 101.

Optionally, governor 106 includes springs 138 which are mechanically connected to pushing flaps 137 and to governor base 134. Springs 138 create discrete positions for pushing flaps 137 and therefore create discrete positions for drive plate 128. The discrete positions are corresponding to the positions of the slits of linear actuators 107.

Figure 12:
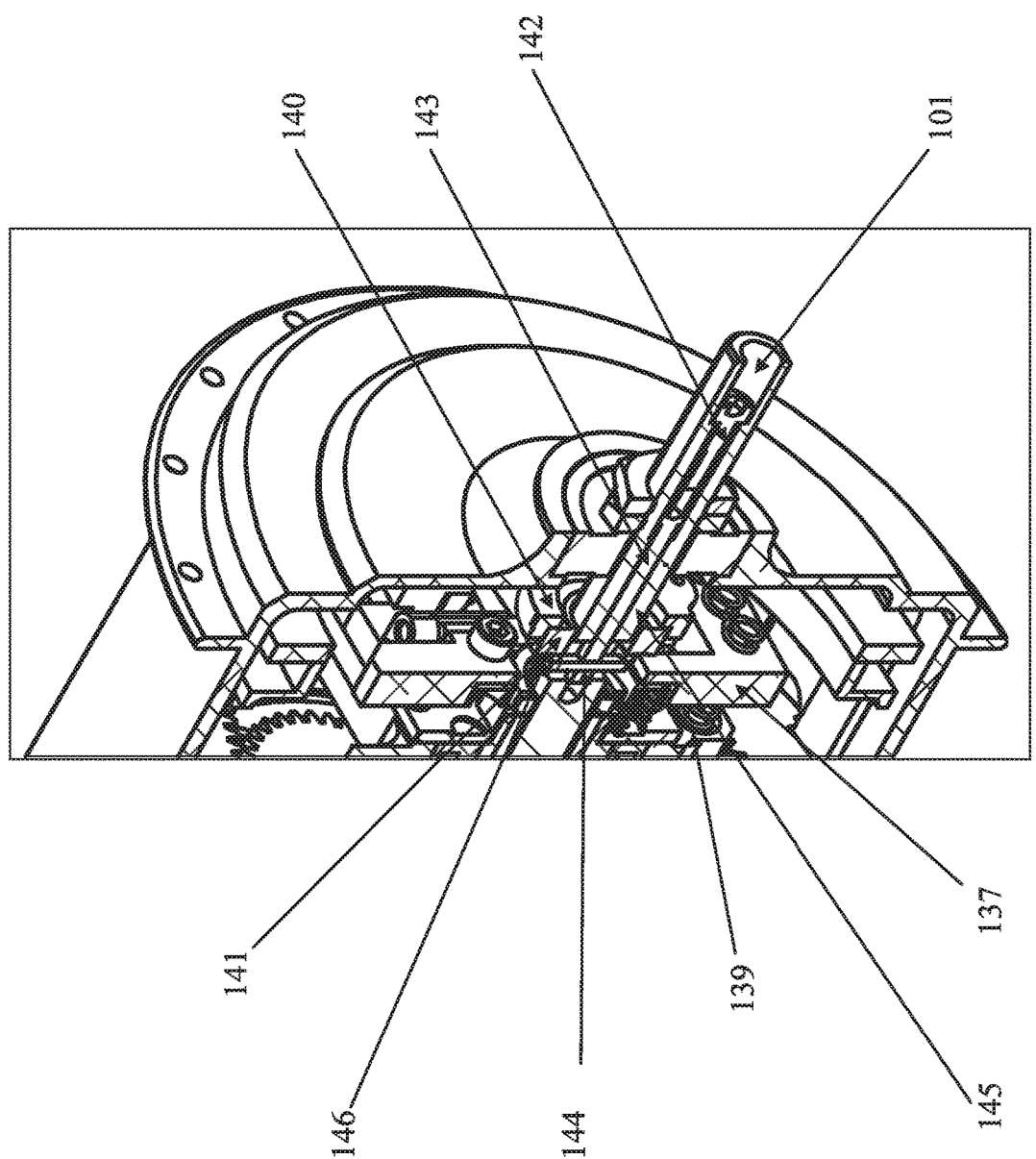
FIG. 12 is an illustration of the governor of the multi-speed hub gear of FIG. 1 having a load adjustment mechanism, according to some embodiments of the present invention.

Optionally, governor 106 includes a pre-load adjustment mechanism for adjusting the initial tension of pushing flaps 137. Reference is now made to FIG. 12, which is an illustration of governor 106 of multi-speed hub gear 100 having a pre-load adjustment mechanism, according to some embodiments of the present invention. The pre-load adjustment mechanism includes an adjustment spring 139, which is a tension spring mechanically connected to pushing flaps 137 and to an adjustable spring holder 140. Spring holder 140 is mounted on a bearing 141 which acts as a bridge between the speed of the spring holder 140, moving with governor 106 and the speed of axle 101. The tension of adjustment spring 139 keeps pushing flaps 137 closed and keeps drive plate 128 in an initial position. Optionally, the amount of tension of adjustment spring 139 is determined by the position of spring holder 140 and is controlled by an adjustment screw 142, which pushes and pulls adjustment spring 139. Optionally, adjustment screw 142 is connected to spring holder 140 and/or bearing 141 via mechanical elements such as an adjustment tube 143, an adjustment pin 144 inserted into a slot 145 of axle 101 and/or an adjuster nut 146, all turning in the same speed as axle 101.

Figure 13:
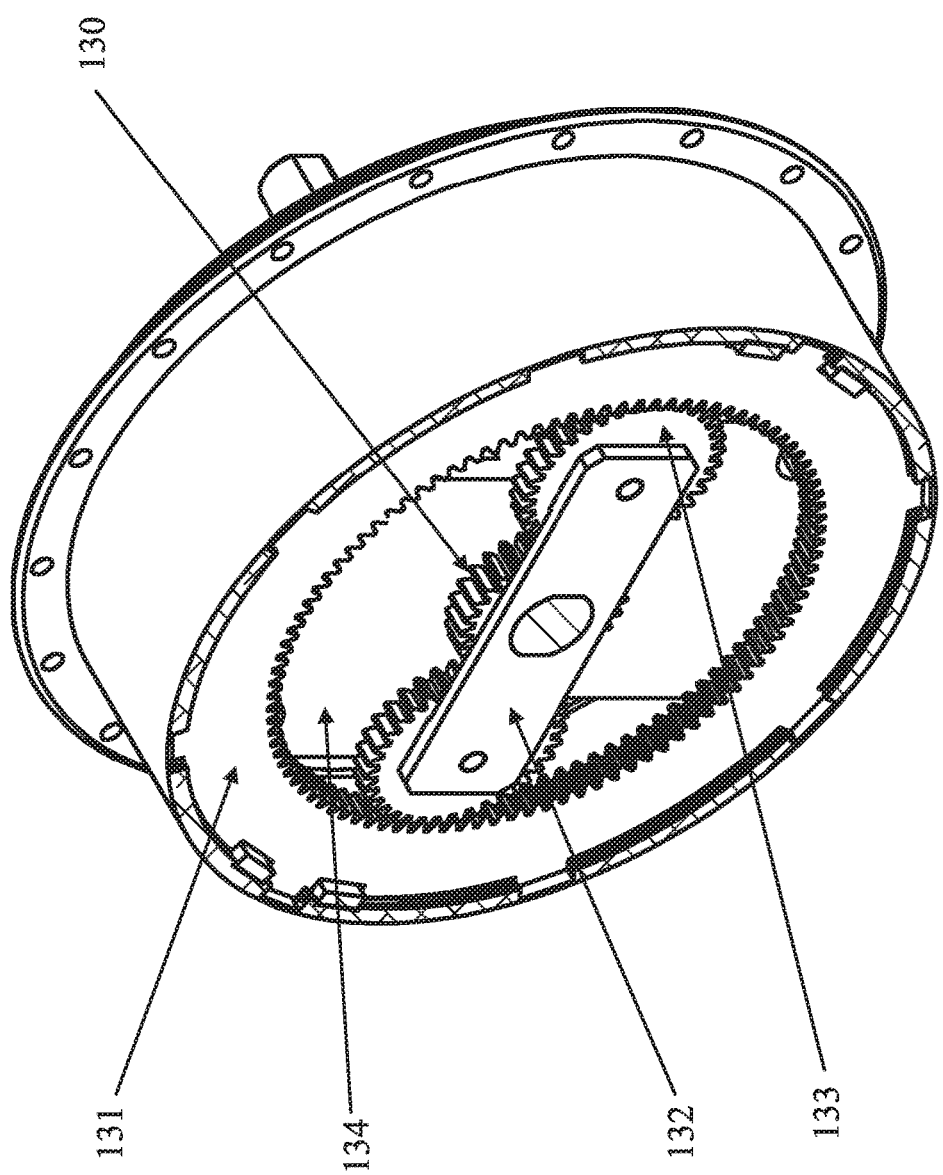
FIG. 13 is an illustration of the governor of the multi-speed hub gear of FIG. 1 having a planetary gear set, according to some embodiments of the present invention.

Optionally, governor 106 includes a governor planetary gear set. Reference is now made to FIG. 13, which is an illustration of governor 106 of multi-speed hub gear 100 having a planetary gear set, according to some embodiments of the present invention. The governor planetary gear set includes a governor central gear 130 concentrically rotates about axle 101, a governor ring gear 131 concentrically fixed to hub shell 102 and a governor rotating gear carrier 132 fixed to axle 101 and mounting governor rotating gears 133. Governor central gear 130 is mechanically connected to governor base 134 so governor base 134, and therefore governor 106, is driven by governor central gear 130 and turns faster than hub shell 102, in the opposite direction, according to the transmission ratio of the governor planetary gear set. The faster turning of governor 106 creates larger centrifugal force and therefore increases the accuracy of the monitoring of the turning speed. Also, as governor 106 is turning in an opposite direction than hub shell 102, it help in canceling gyroscopic forces and increase the stability of the vehicle.

Figure 14C:
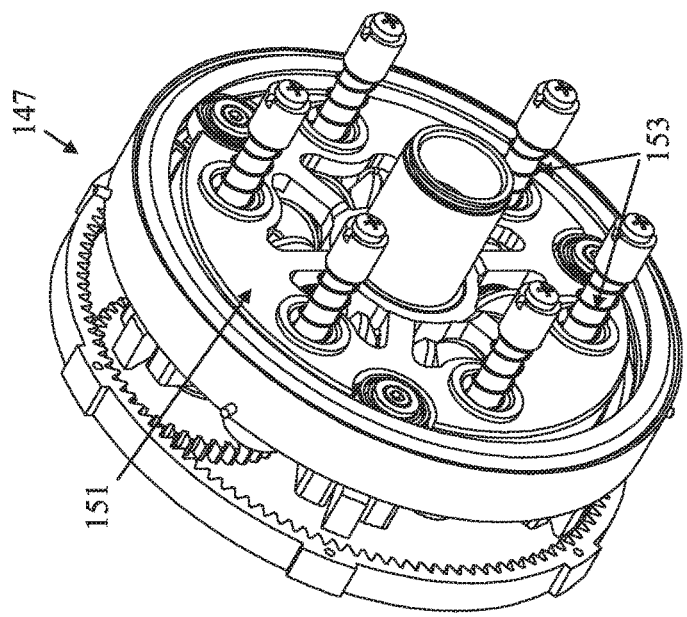
FIG. 14A, FIG. 14B and FIG. 14C are illustrations of a governor of a multi-speed hub gear, having weighted bearings that are directly pushing the drive plate, according to some embodiments of the present invention.
Figure 14B:
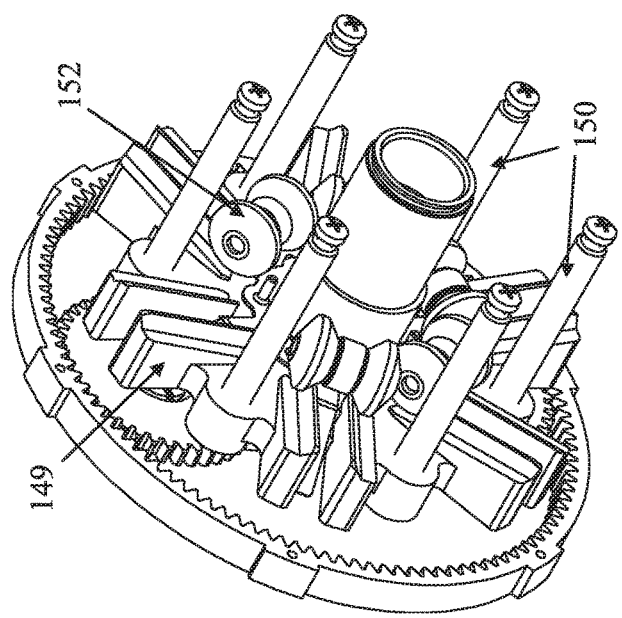
Figure 14A:
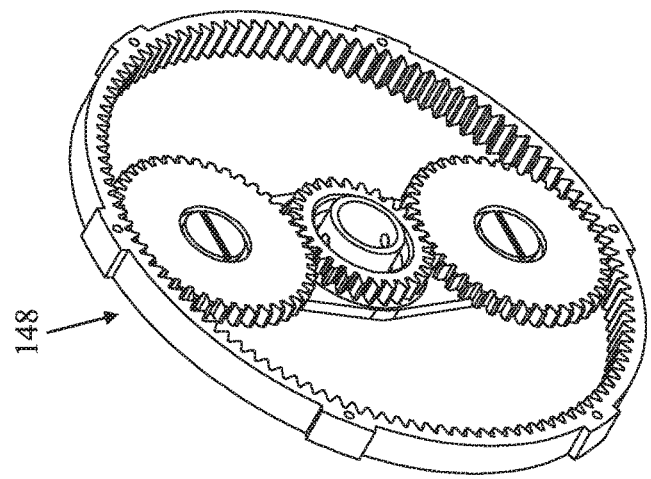

Optionally, the weighted bearings are directly pushing the drive plate. Reference is now made to FIG. 14A, FIG. 14B and FIG. 14C, which are illustrations of a weighted bearings governor 147 of multi-speed hub gear 100 having weighted bearings that are directly pushing the drive plate, according to some embodiments of the present invention. Weighted bearings governor 147 includes a governor planetary gear set 148, for example having a speed ration of 1:3.9, which is driving a governor base 149. Governor base 149 includes guides 150 to hold a drive plate 151. Weighted bearings 152, for example 6 bearings, are positioned between governor base 149 and drive plate 151.

Reference is now made to FIG. 15A which is an illustration of a cross section of governor 147 at low speed, according to some embodiments of the present invention. Reference is also made to FIG. 15B which is an illustration of a cross section of governor 147 at high speed, according to some embodiments of the present invention. When governor 147 is turning, weighted bearings 152 are moved outward by centrifugal force as the speed increases. When weighted bearings 152 are moved outward, they are pushing drive plate 151, which is held to governor base 149 by guides 150, so drive plate 151 is sliding over guides 150. When the speed decreases, drive plate 151 is pushed back by return springs 153 which are held over guides 150. Optionally, the preload of each of return springs 153 is adjustable.

Optionally, weighted bearings 152 are moving on curves which are designed to create discrete positions of drive plate 151 according to the discrete speeds of multi-speed hub gear 100.

Figure 16:
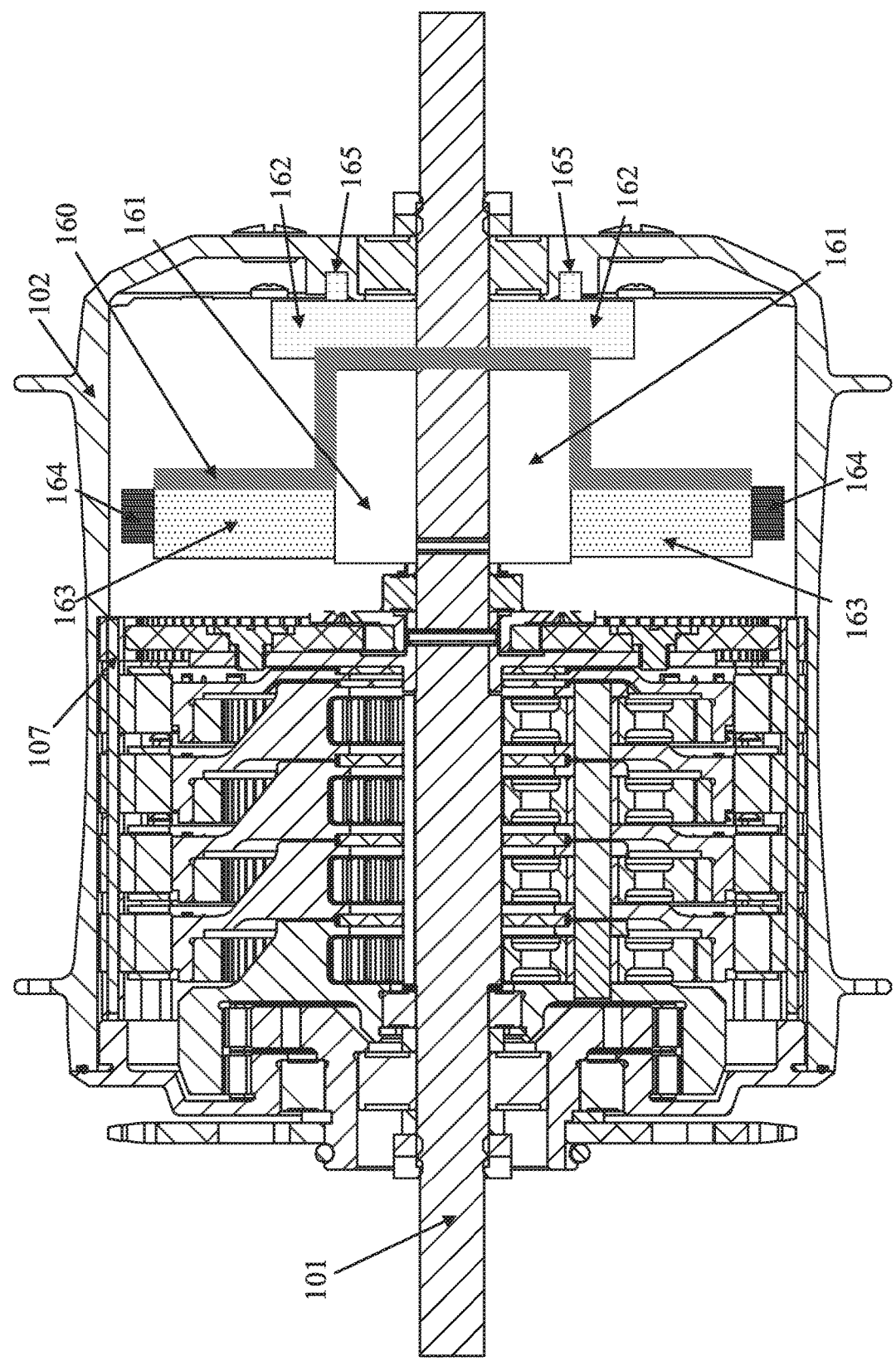
FIG. 16 is a schematic illustration of an electromechanical governor in a multi-speed hub gear, according to some embodiments of the present invention.

Optionally, the turning speed of hub shell 102 is monitored by an electronic device, such as a speed sensor, electronically connected to motor(s) which electronically activates linear actuators 107. Reference is now made to FIG. 16, which is a schematic illustration of an electromechanical governor in a multi-speed hub gear, according to some embodiments of the present invention. The electromechanical governor may consist of components fixed to axle 101 on an inner chassis 160. The components may include rechargeable power source(s) 161, electronic controller 162 and small electric motor(s) 163, which are connected to hub shell 102 by rotating linear actuator interface(s) 164. Hub shell 102 rotates along with magnet(s) 165 embedded in the hub. Sensor(s) on the controller determine the speed which activates motor(s) 163 to move linear actuators 107 and change gears.

Figure 17:
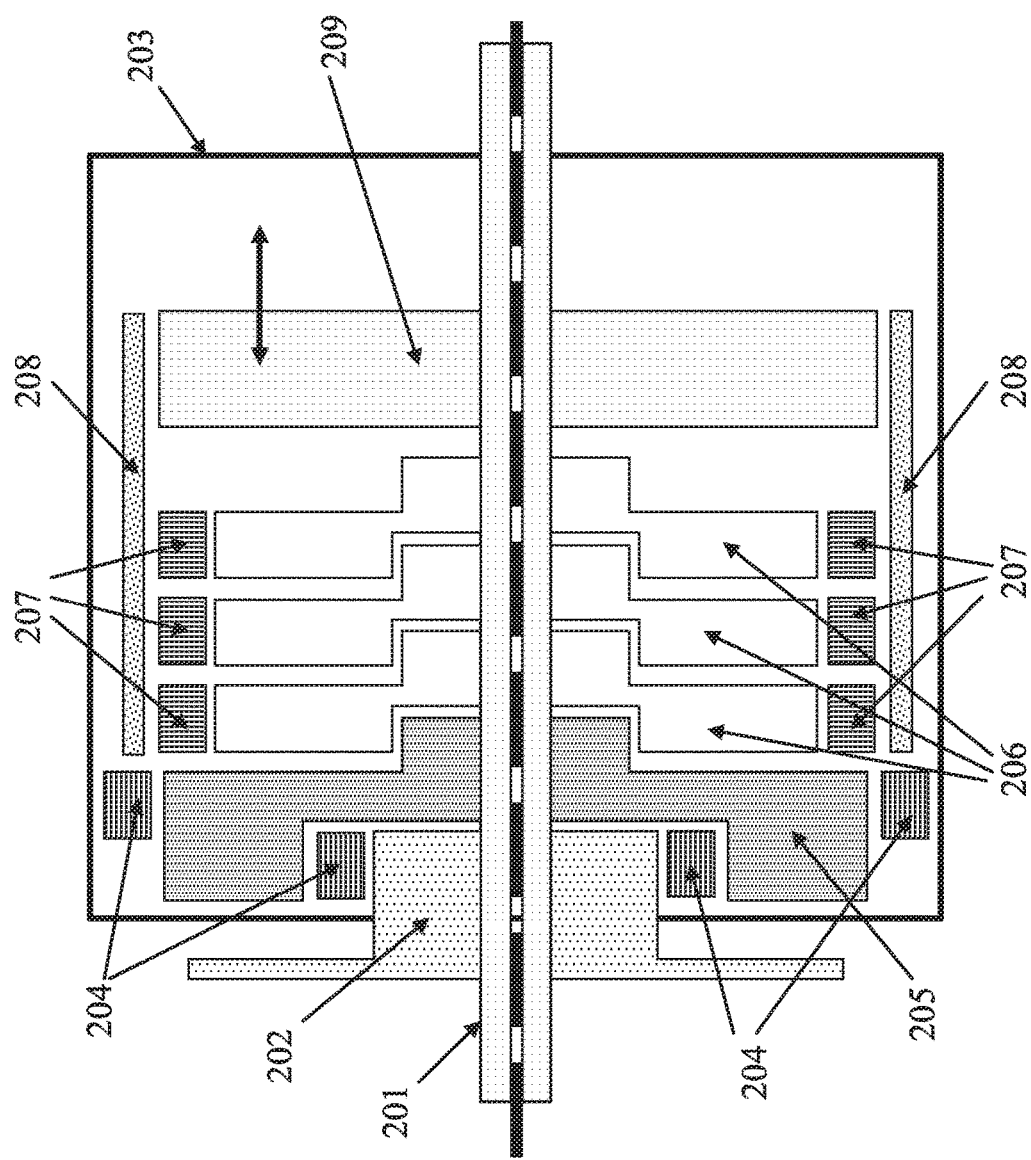
FIG. 17 is a schematic illustration of a multi-speed hub gear, according to some embodiments of the present invention.

Reference is now made to FIG. 17, which is a schematic illustration of a multi-speed hub gear, according to some embodiments of the present invention. The hub axle 201 is fixed to the bicycle frame. Power is inputted via the chain-driven sprocket 202 and out to the hub shell 203 via double one-way bearings 204. The first planet carrier 205 rotates the planetary gear sets 206. Each of planetary gear sets 206 rotates faster than its predecessor. Between each planetary gear set is a lockable one-way bearing 207, which are engaged to hub shell 203 by linear actuators 208. Linear actuators 208 are pushed and pulled by the exemplary governor 209, which is optionally a centrifugal governor. Governor 209 controls which planetary gear set 206 is engaged to hub shell 203 according to the rotating speed of the hub. The function of each one-way bearing 207 is to push hub shell 203 when it is the fastest moving element and to be able to rotate freely when there are elements moving faster than it.

Figure 18:
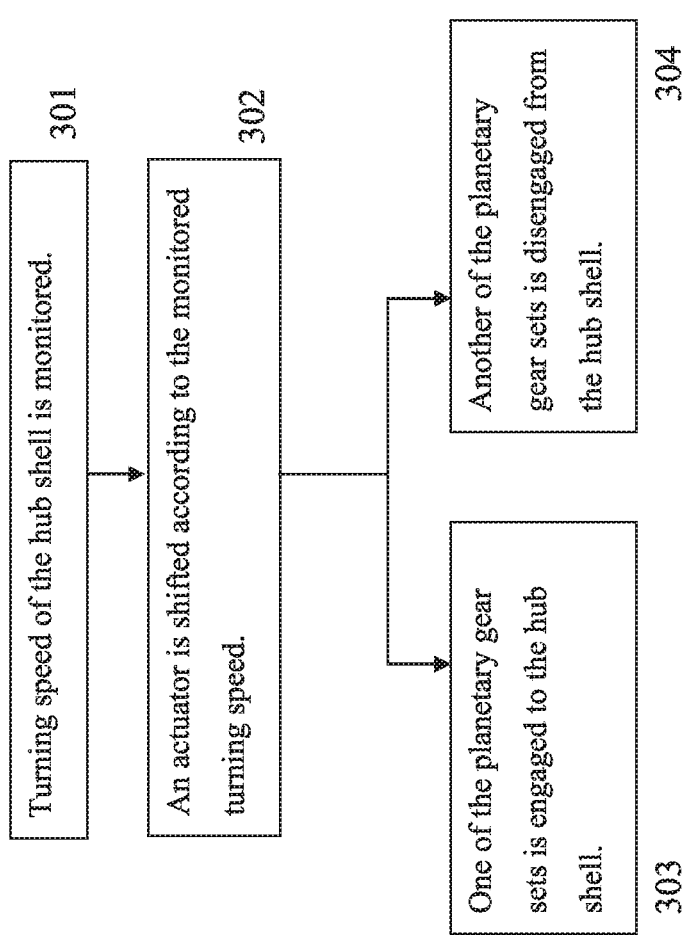
FIG. 18 is a flowchart schematically representing a method for changing transmission ratio in a multi-speed hub gear, according to some embodiments of the present invention.

Reference is now made to FIG. 18, which is a flowchart schematically representing a method for changing transmission ratio in a multi-speed hub gear, according to some embodiments of the present invention.

First, as shown at 301, turning speed of hub shell 102 is monitored, for example by counterweights 135 of governor 106 as described above.

Then, as shown at 302, a gear shifter, for example including actuators 107, is shifted according to the monitored turning speed of hub shell 101. This is done, for example, by a drive plate 128 of governor 106 as described above.

Then, as shown at 302, a gear shifter, for example including actuators 107, is shifted according to the monitored turning speed of hub shell 102. This is done, for example, by a drive plate 128 of governor 106 as described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant multi-speed hub gears will be developed and the scope of the term hub gear is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A multi-speed hub gear, comprising:
   an axle adapted to be fixed against rotation;
   a hub shell;
   a plurality of planetary gear sets, each comprising:
   a central gear concentrically fixed on said axle;
   a rotating gear carrier mounting at least one rotating gear to revolve around the center of said central gear; and
   a ring gear rotated by said at least one rotating gear;
   wherein a respective said ring gear of one of said plurality of planetary gear sets is mechanically connected to a respective said rotating gear carrier of another of said plurality of planetary gear sets such that said plurality of planetary gear sets rotate in conjunction; and
   a gear shifter adapted to engage at least one of said plurality of planetary gear sets to said hub shell while at least partly disengaging another of said plurality of planetary gear sets from said hub shell;
   wherein said gear shifter includes at least one linear actuator having a motion axis parallel to said axle and said engaging and disengaging of said plurality of planetary gear sets from said hub shell is done by a linear motion of said at least one linear actuator along said motion axis;
   wherein said at least one linear actuator includes a plurality of non-linear slits, each laterally positioning a pin in a position of where said pin is engaging one of said plurality of planetary gear sets to said hub shell and in a position of where said pin is disengaging said one of said plurality of planetary gear sets from said hub shell.

2. The multi-speed hub gear of claim 1, wherein said engaging and disengaging includes simultaneously disengaging a first planet carrier of one of said plurality of planetary gear sets and engaging a second planet carrier of another of said plurality of planetary gear sets.

3. The multi-speed hub gear of claim 1, wherein said plurality of planetary gear sets have the same transmission ratio.

4. The multi-speed hub gear of claim 1, wherein said plurality of planetary gear sets are having different transmission ratios.

5. The multi-speed hub gear of claim 1, wherein said engaging and disengaging further includes partly disengaging at least one of said plurality of planetary gear sets so said at least one of said plurality of planetary gear sets rotates freely at a lower speed relative to said hub shell.

6. The multi-speed hub gear of claim 1, further comprising a plurality of lockable bearings, each concentrically mounted between one of said ring gears and said hub shell; wherein said engaging and disengaging is done by changing position of at least one of said plurality of lockable bearings between a locked position where a plurality of rollers of said lockable bearing are locked and an unlocked position where said plurality of rollers are not locked and are free to rotate.

7. The multi-speed hub gear of claim 6, wherein said engaging and disengaging further includes partly engaging at least one of said plurality of planetary gear sets by changing position at least one of said plurality of lockable bearings to a partly unlocked position.

8. The multi-speed hub gear of claim 6, wherein each of said plurality of lockable bearings includes an outer one-way ring and two ring cage plates which includes a plurality of depressions loosely holding said plurality of rollers between said two ring cage plates; wherein said ring cage plates rotate relative to said one-way ring and moves said plurality of rollers between said locked position where said plurality of rollers are locked by said outer one-way ring, and said unlocked position wherein said plurality of rollers are not locked by said outer one-way ring.

9. The multi-speed hub gear of claim 8, wherein each of said plurality of rollers is pushed into locked position by a spring against angled surface of said outer one-way ring.

10. A multi-speed hub gear, comprising:
an axle adapted to be fixed against rotation;
a hub shell;
a plurality of planetary gear sets, each comprising:
a central gear concentrically fixed on said axle;
a rotating gear carrier mounting at least one rotating gear to revolve around the center of said central gear; and
a ring gear rotated by said at least one rotating gear;
wherein a respective said ring gear of one of said plurality of planetary gear sets is mechanically connected to a respective said rotating gear carrier of another of said plurality of planetary gear sets such that said plurality of planetary gear sets rotate in conjunction; and
a gear shifter adapted to engage at least one of said plurality of planetary gear sets to said hub shell while at least partly disengaging another of said plurality of planetary gear sets from said hub shell;
a plurality of lockable bearings, each concentrically mounted between one of said ring gears and said hub shell; wherein said engaging and disengaging is done by changing position of at least one of said plurality of lockable bearings between a locked position where a plurality of rollers of said lockable bearing are locked and an unlocked position where said plurality of rollers are not locked and are free to rotate
wherein each of said plurality of lockable bearings includes an outer one-way ring and two ring cage plates which includes a plurality of depressions loosely holding said plurality of rollers between said two ring cage plates; wherein said ring cage plates rotate relative to said one-way ring and moves said plurality of rollers between said locked position where said plurality of rollers are locked by said outer one-way ring, and said unlocked position wherein said plurality of rollers are not locked by said outer one-way ring;
wherein said two ring cage plates are rotated by a pin fixed to one of said two ring cage plates, said pin is laterally shifted to different positions by at least one linear actuator.

11. The multi-speed hub gear of claim 10, wherein said gear shifter is activated by a governor according to a turning speed of said hub shell.

12. The multi-speed hub gear of claim 11, wherein said governor includes a drive plate which pushes said gear shifter when turning speed of said governor increases.

13. The multi-speed hub gear of claim 12, wherein said governor includes a return spring which pulls said drive plate to an initial position when turning speed of said governor decreases.

14. The multi-speed hub gear of claim 11, wherein said governor includes at least one counterweight having an initial position close to said axle, said at least one counterweight is pushed away from said axle by centrifugal force applied when turning speed of said governor increases.

15. A multi-speed hub gear, comprising:
an axle adapted to be fixed against rotation;
a hub shell;
a plurality of planetary gear sets, each comprising:
a central gear concentrically fixed on said axle;
a rotating gear carrier mounting at least one rotating gear to revolve around the center of said central gear; and
a ring gear rotated by said at least one rotating gear;
wherein a respective said ring gear of one of said plurality of planetary gear sets is mechanically connected to a respective said rotating gear carrier of another of said plurality of planetary gear sets such that said plurality of planetary gear sets rotate in conjunction; and
a gear shifter adapted to engage at least one of said plurality of planetary gear sets to said hub shell while at least partly disengaging another of said plurality of planetary gear sets from said hub shell;
wherein said gear shifter is activated by a governor according to a turning speed of said hub shell;
wherein said governor includes at least one counterweight having an initial position close to said axle, said at least one counterweight is pushed away from said axle by centrifugal force applied when turning speed of said governor increases; wherein said at least one counterweight pushes a drive plate which pushes said gear shifter when turning speed of said governor increases.

16. A multi-speed hub gear, comprising:
an axle adapted to be fixed against rotation;
a hub shell;
a plurality of planetary gear sets, each comprising:
a central gear concentrically fixed on said axle;
a rotating gear carrier mounting at least one rotating gear to revolve around the center of said central gear; and a ring gear rotated by said at least one rotating gear;
wherein a respective said ring gear of one of said plurality of planetary gear sets is mechanically connected to a respective said rotating gear carrier of another of said plurality of planetary gear sets such that said plurality of planetary gear sets rotate in conjunction; and
a gear shifter adapted to engage at least one of said plurality of planetary gear sets to said hub shell while at least partly disengaging another of said plurality of planetary gear sets from said hub shell;
wherein said gear shifter is activated by a governor according to a turning speed of said hub shell;
wherein said governor includes at least one counterweight having an initial position close to said axle, said at least one counterweight is pushed away from said axle by centrifugal force applied when turning speed of said governor increases; wherein said at least one counterweight pushes at least one pushing flap mechanically connected to said at least one counterweight, said at least one pushing flap pushes a drive plate which pushes said gear shifter when turning speed of said governor increases.

17. The multi-speed hub gear of claim 16, used in a wheeled vehicle, wherein said axle is adapted to be fixed against rotation in a wheel holder of a wheeled vehicle frame and said hub shell is mechanically connected to a wheel.

18. A multi-speed hub gear, comprising:
an axle adapted to be fixed against rotation;
a hub shell;
a plurality of planetary gear sets, each comprising:
  a central gear concentrically fixed on said axle;
  a rotating gear carrier mounting at least one rotating gear to revolve around the center of said central gear; and
  a ring gear rotated by said at least one rotating gear;
  wherein a respective said ring gear of one of said plurality of planetary gear sets is mechanically connected to a respective said rotating gear carrier of another of said plurality of planetary gear sets such that said plurality of planetary gear sets rotate in conjunction; and
a gear shifter adapted to engage at least one of said plurality of planetary gear sets to said hub shell while at least partly disengaging another of said plurality of planetary gear sets from said hub shell;
wherein said gear shifter is activated by a governor according to a turning speed of said hub shell
wherein said governor includes a governor planetary gear set, said governor planetary gear set comprising:
  a governor rotating gear carrier fixed on said axle and mounting at least one governor rotating gear;
  a governor ring gear concentrically fixed to said hub shell; and
  a governor central gear mechanically connected to a governor base so said governor base turns faster than said hub shell.

19. A multi-speed hub gear, comprising:
an axle adapted to be fixed against rotation;
a hub shell;
a plurality of planetary gear sets, each comprising:
  a central gear concentrically fixed on said axle;
  a rotating gear carrier mounting at least one rotating gear to revolve around the center of said central gear; and
  a ring gear rotated by said at least one rotating gear;
  wherein a respective said ring gear of one of said plurality of planetary gear sets is mechanically connected to a respective said rotating gear carrier of another of said plurality of planetary gear sets such that said plurality of planetary gear sets rotate in conjunction; and
a gear shifter adapted to engage at least one of said plurality of planetary gear sets to said hub shell while at least partly disengaging another of said plurality of planetary gear sets from said hub shell;
wherein said gear shifter is activated by a governor according to a turning speed of said hub shell;
wherein said governor includes at least one speed sensor and at least one motor electronically connected to said at least one speed sensor and activates said gear shifter.

20. The multi-speed hub gear of claim 19, further comprising:
a double one-way bearing mechanism which drives said hub shell.

21. The multi-speed hub gear of claim 20, wherein said double one-way bearing mechanism includes:
a first one-way bearing connecting a sprocket to a first rotating gear carrier of a first of said plurality of planetary gear sets so said sprocket drives said first planetary gear set; and
a second one-way bearing connecting said first rotating gear carrier to said hub shell, so sprocket also drives said hub shell.

22. The multi-speed hub gear of claim 21, wherein at least one of said first one-way bearing and said second one-way bearing includes a trapped roller mechanism.

23. The multi-speed hub gear of claim 21, wherein at least one of said first one-way bearing and said second one-way bearing includes a sprag clutch mechanism.

24. The multi-speed hub gear of claim 21, wherein at least one of said first one-way bearing and said second one-way bearing includes a ratchet mechanism.

25. A method of changing transmission ratio in a multi-speed hub gear, comprising:
shifting a gear shifter according to a turning speed of a hub shell of said multi-speed hub gear relative to an axle adapted to be fixed against rotation;
engaging at least one of a plurality of planetary gear sets to said hub shell, each of said plurality of planetary gear sets comprising:
  a central gear concentrically fixed on said axle;
  a rotating gear carrier mounting at least one rotating gear to revolve around the center of said central gear; and
  a ring gear rotated by said at least one rotating gear;
  wherein a respective said ring gear of one of said plurality of planetary gear sets is mechanically connected to a respective said rotating gear carrier of another of said plurality of planetary gear sets such that said plurality of planetary gear sets rotate in conjunction; and
at least partly disengaging another one of said plurality of planetary gear sets from said hub shell;
wherein said engaging and said at least partly disengaging is done by changing position of at least one of a plurality of lockable bearings between a locked position where a plurality of rollers of said lockable bearing are locked and an unlocked position where said plurality of rollers are not locked and are free to rotate;

wherein each one of said plurality of lockable bearings is concentrically mounted between one of said ring gears and said hub shell;

wherein each of said plurality of lockable bearings includes an outer one-way ring and two ring cage plates which includes a plurality of depressions loosely holding said plurality of rollers between said two ring cage plates; wherein said ring cage plates rotate relative to said one-way ring and moves said plurality of rollers between said locked position where said plurality of rollers are locked by said outer one-way ring, and said unlocked position wherein said plurality of rollers are not locked by said outer one-way ring;

wherein said two ring cage plates are rotated by a pin fixed to one of said two ring cage plates, said pin is laterally shifted to different positions by said gear shifter.

26. A multi-speed hub gear, comprising:
an axle adapted to be fixed against rotation;
a hub shell;
a plurality of planetary gear sets, each comprising:
   a central gear concentrically fixed on said axle;
   a rotating gear carrier mounting at least one rotating gear to revolve around the center of said central gear; and
   a ring gear rotated by said at least one rotating gear;
a plurality of lockable bearings, each concentrically mounted between one of said ring gears and said hub shell;
a gear shifter adapted to engage at least one of said plurality of planetary gear sets to said hub shell while at least partly disengaging another of said plurality of planetary gear sets from said hub shell; and
a governor activating said gear shifter according to a turning speed of said hub shell;

wherein said engaging and disengaging is done by changing position of at least one of said plurality of lockable bearings between a locked position where a plurality of rollers of said lockable bearing are locked and an unlocked position where said plurality of rollers are not locked and are free to rotate;

wherein each of said plurality of lockable bearings includes an outer one-way ring and two ring cage plates which includes a plurality of depressions loosely holding said plurality of rollers between said two ring cage plates; wherein said ring cage plates rotate relative to said one-way ring and moves said plurality of rollers between said locked position where said plurality of rollers are locked by said outer one-way ring, and said unlocked position wherein said plurality of rollers are not locked by said outer one-way ring;

wherein said two ring cage plates are rotated by a pin fixed to one of said two ring cage plates, said pin is laterally shifted to different positions by said gear shifter.

* * * * *